(12) United States Patent
Li et al.

(10) Patent No.: US 12,244,823 B2
(45) Date of Patent: *Mar. 4, 2025

(54) ENCODER-SIDE OPTIONS FOR INTRA BLOCK COPY PREDICTION MODE FOR VIDEO AND IMAGE CODING

(71) Applicant: Microsoft Technology Licensing, LLC, Redmond, WA (US)

(72) Inventors: Bin Li, Beijing (CN); Jizheng Xu, Beijing (CN); Gary J. Sullivan, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 488 days.

This patent is subject to a terminal disclaimer.

(21) Appl. No.: 17/390,570

(22) Filed: Jul. 30, 2021

(65) Prior Publication Data

US 2021/0360262 A1 Nov. 18, 2021

Related U.S. Application Data

(63) Continuation of application No. 15/025,032, filed as application No. PCT/CN2013/085170 on Oct. 14, 2013, now Pat. No. 11,109,036.

(51) Int. Cl.
| | |
|---|---|
| *H04N 19/159* | (2014.01) |
| *H04N 19/11* | (2014.01) |
| *H04N 19/172* | (2014.01) |
| *H04N 19/176* | (2014.01) |
| *H04N 19/513* | (2014.01) |

(Continued)

(52) U.S. Cl.
CPC ............ *H04N 19/159* (2014.11); *H04N 19/11* (2014.11); *H04N 19/172* (2014.11); *H04N 19/176* (2014.11); *H04N 19/521* (2014.11); *H04N 19/57* (2014.11); *H04N 19/593* (2014.11); *H04N 19/96* (2014.11)

(58) Field of Classification Search
CPC .... H04N 19/11; H04N 19/159; H04N 19/172; H04N 19/176; H04N 19/521; H04N 19/57; H04N 19/593; H04N 19/96
USPC ......................................................... 375/240
See application file for complete search history.

(56) References Cited

U.S. PATENT DOCUMENTS

| | | |
|---|---|---|
| 6,249,612 B1 | 6/2001 | Ogura |
| 9,591,325 B2 | 3/2017 | Li et al. |

(Continued)

OTHER PUBLICATIONS

Minezawa, K. Sugimoto and S. Sekiguchi, "Block boundary filtering for intra prediction samples," 2013 IEEE International Conference on Consumer Electronics (ICCE), 2013, pp. 641-644 (Year: 2013).*

(Continued)

*Primary Examiner* — William C Vaughn, Jr.
*Assistant Examiner* — Naod W Belai
(74) *Attorney, Agent, or Firm* — Klarquist Sparkman, LLP

(57) ABSTRACT

Innovations in encoder-side options for intra block copy ("BC") prediction mode facilitate intra BC prediction that is more effective in terms of rate-distortion performance and/or computational efficiency of encoding. For example, some of the innovations relate to concurrently performing block vector ("BV") estimation and making block splitting decisions for a block. Other innovations relate to selectively merging blocks into a larger block during BV estimation.

20 Claims, 17 Drawing Sheets

(51) Int. Cl.
　　　*H04N 19/57*　　　(2014.01)
　　　*H04N 19/593*　　(2014.01)
　　　*H04N 19/96*　　　(2014.01)

(56) References Cited

U.S. PATENT DOCUMENTS

| | | | |
|---|---|---|---|
| 10,368,091 B2 | 7/2019 | Li et al. | |
| 10,390,034 B2 | 8/2019 | Zhu et al. | |
| 10,469,863 B2 | 11/2019 | Zhu et al. | |
| 10,582,213 B2 | 3/2020 | Li et al. | |
| 10,785,486 B2 | 9/2020 | Li et al. | |
| 10,812,817 B2 | 10/2020 | Li et al. | |
| 11,109,036 B2 | 8/2021 | Li et al. | |
| 11,172,207 B2 | 11/2021 | Li et al. | |
| 11,284,103 B2 | 3/2022 | Zhu et al. | |
| 11,317,113 B2 | 4/2022 | Li et al. | |
| 11,334,756 B2 | 5/2022 | Neser | |
| 11,363,283 B2 | 6/2022 | Li et al. | |
| 11,388,433 B2 | 7/2022 | Zhu et al. | |
| 11,595,679 B1 | 2/2023 | Zhu et al. | |
| 11,632,558 B2 | 4/2023 | Li et al. | |
| 11,758,162 B2 | 9/2023 | Li et al. | |
| 2005/0226333 A1 | 10/2005 | Suzuki et al. | |
| 2013/0089134 A1 | 4/2013 | Wang et al. | |
| 2013/0114720 A1* | 5/2013 | Wang | H04N 19/197 375/240.16 |
| 2013/0287097 A1* | 10/2013 | Song | H04N 19/117 375/240.03 |
| 2014/0301465 A1* | 10/2014 | Kwon | H04N 19/503 375/240.16 |
| 2014/0376634 A1* | 12/2014 | Guo | H04N 19/523 375/240.16 |
| 2016/0323591 A1 | 11/2016 | Chuang et al. | |
| 2017/0026641 A1 | 1/2017 | Lai et al. | |
| 2017/0127058 A1 | 5/2017 | Misra et al. | |
| 2017/0347123 A1 | 11/2017 | Panusopone et al. | |
| 2018/0063547 A1 | 3/2018 | Kobayashi | |
| 2020/0351521 A1* | 11/2020 | Xu | H04N 19/105 |
| 2022/0030251 A1 | 1/2022 | Li et al. | |
| 2022/0201326 A1 | 6/2022 | Li et al. | |
| 2022/0264131 A1 | 8/2022 | Li et al. | |
| 2022/0295093 A1 | 9/2022 | Zhu et al. | |
| 2023/0009491 A1 | 1/2023 | Deng | |
| 2023/0038995 A1 | 2/2023 | Zhu et al. | |
| 2023/0164315 A1 | 5/2023 | Lee et al. | |
| 2023/0164349 A1 | 5/2023 | Zhu et al. | |
| 2023/0209068 A1 | 6/2023 | Li et al. | |
| 2023/0239495 A1 | 7/2023 | Zhu et al. | |
| 2023/0353767 A1 | 11/2023 | Li et al. | |
| 2024/0244252 A1 | 7/2024 | Zhu et al. | |

OTHER PUBLICATIONS

Communication pursuant to Article 94(3) EPC dated Oct. 28, 2021, from European Patent Application No. 14895133.8, 4 pp.
Communication pursuant to Rules 70(2) and 70a(2) EPC and reference to Rule 39(1) EPC dated Dec. 6, 2021, from European Patent Application No. 21186125.7, 2 pp.
Communication pursuant to Rules 70(2) and 70a(2) EPC and reference to Rule 39(1) EPC dated Dec. 5, 2022, from European Patent Application No. 22182574.8, 2 pp.
Communication under Rule 71(3) EPC dated Apr. 14, 2022, from European Patent Application No. 14876901.1, 7 pp.
Decision to Grant dated Jun. 10, 2022, from European Patent Application No. 14876901.1, 2 pp.
Decision to Refuse a European patent application (Art. 97(2) EPC) dated Mar. 30, 2022, from European Patent Application No. 17175228.0, 4 pp.
Extended European Search Report dated Nov. 3, 2021, from European Patent Application No. 21186125.7, 11 pp.
Extended European Search Report dated Nov. 3, 2022, from European Patent Application No. 22182574.8, 12 pp.
Min et al., "Non-RCE3: Intra Motion Compensation for Screen Contents," JCTVC-N0285, 3 pp. (Jul. 2013).
Minezawa et al., "Block Boundary Filtering for Intra Prediction Samples," *IEEE Int'l Conf. on Consumer Electronics*, pp. 641-644 (2013).
Naccari et al., "HEVC Range extensions test model 5 encoder description," JCTVC-O1013, pp. 1-16 (Oct. 2013).
Notice of Allowance dated Nov. 19, 2021, from Korean Patent Application No. 10-2021-7014829, 6 pp.
Notice of Allowance dated Nov. 24, 2021, from Korean Patent Application No. 10-2016-7021252, 6 pp.
Notice of Allowance dated Dec. 15, 2021, from U.S. Appl. No. 16/783,852, 16 pp.
Notice of Allowance dated Feb. 3, 2022, from U.S. Appl. No. 17/009,495, 6 pp.
Notice of Allowance dated Feb. 22, 2022, from U.S. Appl. No. 16/577,883, 11 pp.
Notice of Allowance dated Feb. 21, 2022, from Korean Patent Application No. 10-2021-7015749, 6 pp.
Notice of Allowance dated Apr. 6, 2022, from Korean Patent Application No. 10-2021-7032017, 6 pp.
Notice of Allowance dated May 11, 2022, from Canadian Patent Application No. 2,959,682, 1 p.
Notice of Allowance dated Oct. 31, 2022, from U.S. Appl. No. 17/581,446, 9 pp.
Notice of Allowance dated Dec. 12, 2022, from U.S. Appl. No. 17/497,451, 8 pp.
Office Action dated Nov. 12, 2021, from U.S. Appl. No. 17/009,495, 14 pp.
Office Action dated Nov. 18, 2021, from Korean Patent Application No. 10-2021-7032017, 4 pp. [English translation not available].
Office Action dated Aug. 10, 2022, from U.S. Appl. No. 17/497,451, 8 pp.
Provision of a copy of the minutes in accordance with Rule 124(4) EPC dated Apr. 12, 2022, from European Patent Application No. 14876901.1, 25 pp.
Summons to attend oral proceedings pursuant to Rule 115(1) EPC dated Jan. 28, 2022, from European Patent Application No. 17175228.0, 11 pp.
Communication pursuant to Article 94(3) EPC dated Aug. 27, 2024, from European Patent Application No. 22182574.8, 7 pp.
Communication pursuant to Rules 70(2) and 70a(2) EPC and reference to Rule 39(1) EPC dated Jun. 24, 2024, from European Patent Application No. 24159778.0, 2 pp.
Office Action dated Jul. 1, 2024, from U.S. Appl. No. 17/691,802, 15 pp.
Office Action dated Sep. 10, 2024, from U.S. Appl. No. 18/632,052, 8 pp.
Notice of Allowance dated Apr. 7, 2023, from U.S. Appl. No. 17/739,299, 9 pp.
Notice of Allowance dated Jun. 2, 2023, from Korean Patent Application No. 10-2022-7020924, 8 pp.
Office Action dated Feb. 9, 2023, from U.S. Appl. No. 17/739,299, 6 pp.
Office Action dated Feb. 20, 2023, from Korean Patent Application No. 10-2022-7020924, 6 pp.
Office Action dated Mar. 2, 2023, from U.S. Appl. No. 17/751,392, 16 pp.
Communication pursuant to Article 94(3) EPC dated Aug. 18, 2023, from European Patent Application No. 21186125.7, 4 pp.
Communication pursuant to Article 94(3) EPC dated Oct. 26, 2023, from European Patent Application No. 14895133.8, 8 pp.
Guo et al., "RCE4: Results of Test 2 on Palette Mode for Screen Content Coding", JCTVC-P0198, 3 p. (Jan. 2014).
Notice of Allowance dated Sep. 5, 2023, from European Patent Application No. 15704401.7, 8 pp.
Notice of Allowance dated Oct. 4, 2023, from U.S. Appl. No. 17/751,392, 11 pp.
Office Action dated Aug. 17, 2023, from U.S. Appl. No. 18/158,306, 7 pp.
Office Action dated Aug. 31, 2023, from U.S. Appl. No. 18/158,295, 7 pp.

(56) References Cited

OTHER PUBLICATIONS

Office Action dated Sep. 15, 2023, from U.S. Appl. No. 18/178,599, 8 pp.
Sjoberg et al., "Overview of HEVC high-level syntax and reference picture management," IEEE Trans. on Circuits and Systems for Video Technology, vol. 22, No. 12, 14 pp. (Oct. 2012).
Chang et al., RCE3: Results of Subtest D.2 on Nx2N/2NxN/NxN Intra Block Copy, JCTVC-P0180, 8 pp. (Jan. 2014).
Examiner's Report dated Nov. 21, 2023, from Canadian Patent Application No. 3171803, 4 pp.
Extended European Search Report dated Mar. 5, 2024, from European Patent Application No. 24151900.8, 11 pp.
Moschetti et al., "A Nested-Multilevel Redundancy Exploitation for Fast Block Matching," *Int'l Conf. on Image Processing*, pp. 856-859 (Sep. 2000).
Notice of Allowance dated Dec. 28, 2023, from U.S. Appl. No. 18/158,295, 9 pp.
Notice of Allowance dated Dec. 29, 2023, from U.S. Appl. No. 18/158,306, 9 pp.
Notice of Allowance dated Jan. 10, 2024, from U.S. Appl. No. 18/178,599, 5 pp.
Office Action dated Jan. 12, 2024, from U.S. Appl. No. 18/218,796, 7 pp.
Communication pursuant to Rules 70(2) and 70a(2) EPC and reference to Rule 39(1) EPC dated Apr. 8, 2024, from European Patent Application No. 24151900.8, 2 pp.
Notice of Allowance dated Apr. 25, 2024, from U.S. Appl. No. 18/218,796, 5 pp.
Office Action dated Apr. 16, 2024, from Korean Patent Application No. 10-2023-7030245, 6 pp.
U.S. Appl. No. 17/751,392, filed May 23, 2022.
U.S. Appl. No. 18/158,295, filed Jan. 23, 2023.
U.S. Appl. No. 18/158,306, filed Jan. 23, 2023.
U.S. Appl. No. 18/178,599, filed Mar. 6, 2023.
Decision to Grant dated Jul. 20, 2021, from Japanese Patent Application No. 2019-208035, 5 pp.
Final Office Action dated Sep. 29, 2021, from U.S. Appl. No. 16/577,883, 29 pp.
Notice of Allowance dated Jul. 1, 2021, from Korean Patent Application No. 10-2017-7001605, 6 pp.
Notice of Allowance dated Aug. 20, 2021, from Korean Patent Application No. 10-2021-7010079, 6 pp.
Notice of Allowance dated Oct. 20, 2021, from U.S. Appl. No. 14/455,856, 11 pp.
Notification of Reason for Refusal dated Aug. 18, 2021, from Korean Patent Application No. 10-2021-7015749, 5 pp.
Notice of Allowance dated Oct. 21, 2024, from U.S. Appl. No. 17/691,802, 14 pp.
Notice of Allowance dated Dec. 3, 2024, from Korean Patent Application No. 10-2023-7030245, 8 pp.
Office Action dated Dec. 3, 2024, from U.S. Appl. No. 18/404,749, 26 pp.
Office Action dated Dec. 3, 2024, from U.S. Appl. No. 18/620,604, 8 pp.

\* cited by examiner software 180 implementing one or more innovations for encoder-side options for intra block copy prediction

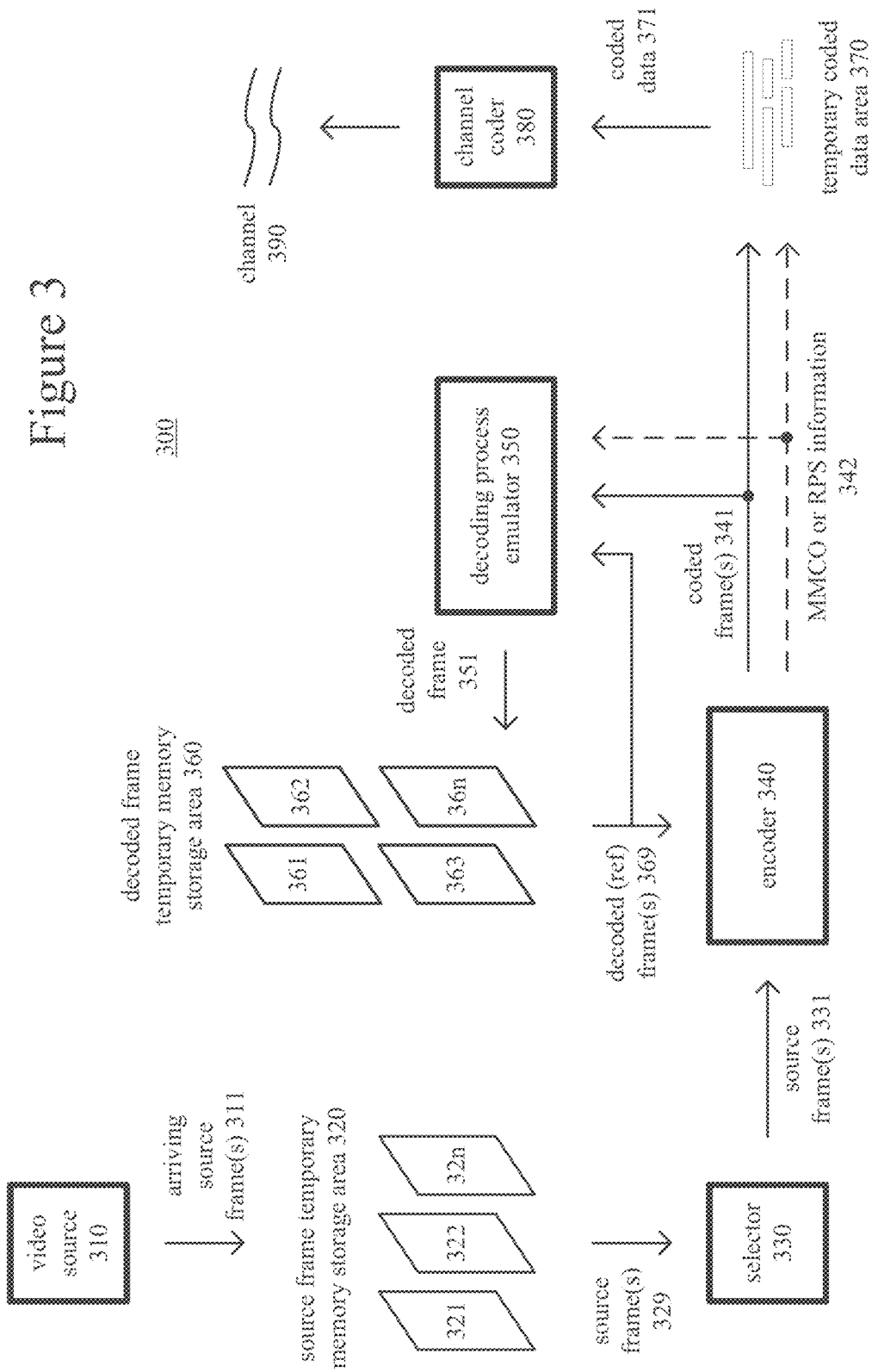

500

600 block vector (740) for current block (730) of current frame (710),
indicating a displacement to a region (750) in the current frame (710)

candidate block vectors (842, 844) indicating displacements to regions that
are outside of search range for current block (830) of current frame (810)

1000 z-scan order for current block and blocks that may include bottom right position of the region for a BV Figure 12
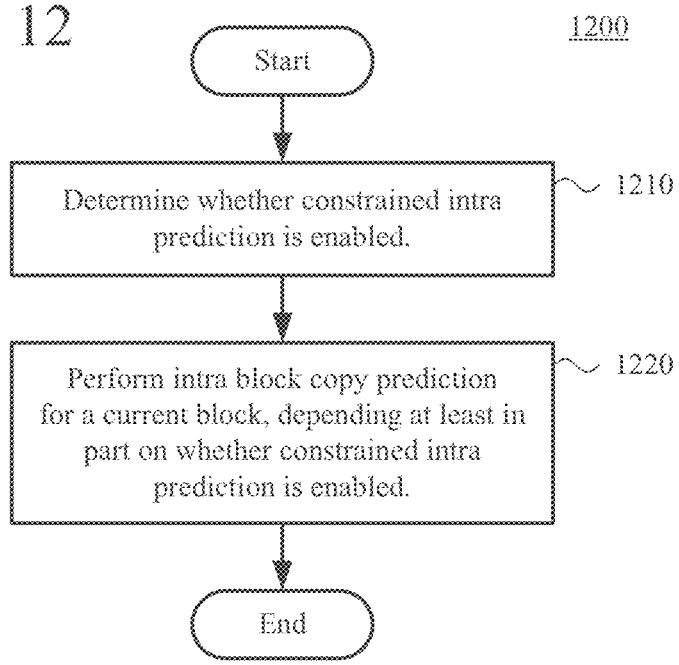
Figure 13
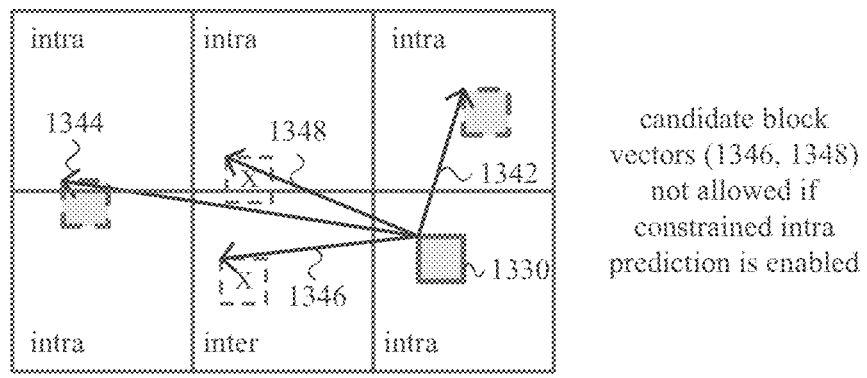
candidate block vectors (1346, 1348) not allowed if constrained intra prediction is enabled
Figure 14
| if( intra_block_copy_enabled_flag && (!constrained_intra_pred_flag || slice_type == I ) ) | |
| --- | --- |
|    intra_bc_flag[ x0 ][ y0 ] | ae(v) |

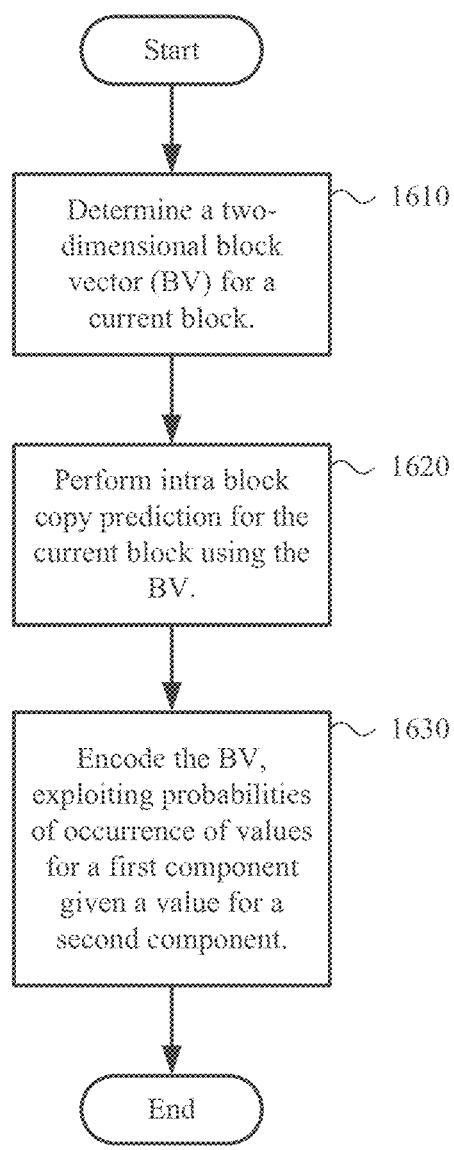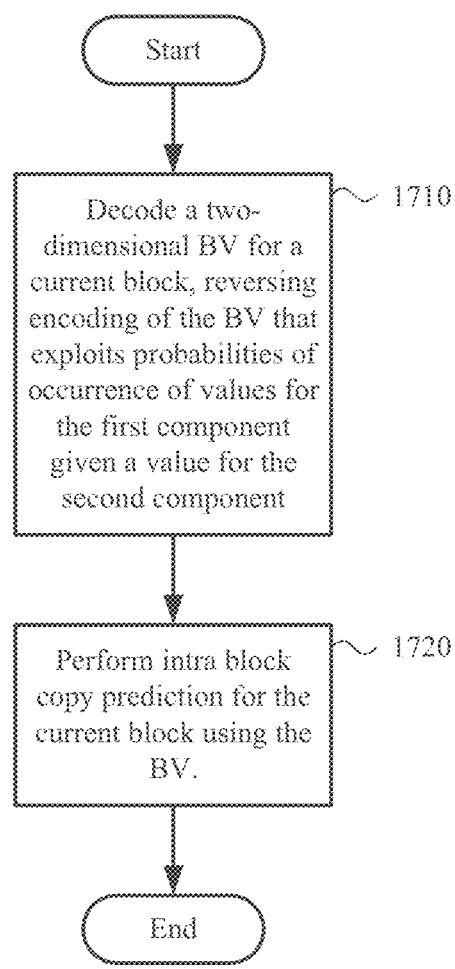

ENCODER-SIDE OPTIONS FOR INTRA BLOCK COPY PREDICTION MODE FOR VIDEO AND IMAGE CODING

CROSS REFERENCE TO RELATED APPLICATIONS

This application is a continuation of U.S. patent application Ser. No. 15/025,032, filed Mar. 25, 2016, which is the U.S. National Stage of International Application No. PCT/CN2013/085170, filed Oct. 14, 2013, which was published in English under PCT Article 21 (2), and which is incorporated by reference herein in its entirety.

BACKGROUND

Engineers use compression (also called source coding or source encoding) to reduce the bit rate of digital video. Compression decreases the cost of storing and transmitting video information by converting the information into a lower bit rate form. Decompression (also called decoding) reconstructs a version of the original information from the compressed form. A "codec" is an encoder/decoder system.

Over the last two decades, various video codec standards have been adopted, including the ITU-T H.261, H.262 (MPEG-2 or ISO/IEC 13818-2), H.263 and H.264 (MPEG-4 AVC or ISO/IEC 14496-10) standards, the MPEG-1 (ISO/IEC 11172-2) and MPEG-4 Visual (ISO/IEC 14496-2) standards, and the SMPTE 421M standard. More recently, the HEVC standard (ITU-T H.265 or ISO/IEC 23008-2) has been approved. Extensions to the HEVC standard (e.g., for scalable video coding/decoding, for coding/decoding of video with higher fidelity in terms of sample bit depth or chroma sampling rate, or for multi-view coding/decoding) are currently under development. A video codec standard typically defines options for the syntax of an encoded video bitstream, detailing parameters in the bitstream when particular features are used in encoding and decoding. In many cases, a video codec standard also provides details about the decoding operations a decoder should perform to achieve conforming results in decoding. Aside from codec standards, various proprietary codec formats define other options for the syntax of an encoded video bitstream and corresponding decoding operations.

Infra block copy ("BC") is a prediction mode under consideration for HEVC extensions. For intra BC prediction mode, the sample values of a current block of a picture are predicted using previously reconstructed sample values in the same picture. A block vector ("BV") indicates a displacement from the current block to a region of the picture that includes the previously reconstructed sample values used for prediction. The BV is signaled in the bitstream. Infra BC prediction is a form of intra-picture prediction-intra BC prediction for a block of a picture does not use any sample values other than sample values in the same picture.

As currently specified in the HEVC standard and implemented in some reference software for the HEVC standard, intra BC prediction mode has several problems. For example, encoder-side decisions about how to use infra BC prediction are not made effectively.

SUMMARY

In summary, the detailed description presents innovations in encoder-side operations for intra block copy ("BC") prediction mode. For example, some of the innovations relate to concurrently performing block vector ("BV") estimation and making block splitting decisions for a block. Other innovations relate to selectively merging blocks into a larger block during BV estimation.

The innovations for encoder-side options for intra BC prediction mode can be implemented as part of a method, as part of a computing device adapted to perform the method or as part of a tangible computer-readable media storing computer-executable instructions for causing a computing device to perform the method. The various innovations can be used in combination or separately.

The foregoing and other objects, features, and advantages of the invention will become more apparent from the following detailed description, which proceeds with reference to the accompanying figures.

BRIEF DESCRIPTION OF THE DRAWINGS

FIG. 3 is a diagram of an example encoder system in conjunction with which some described embodiments can be implemented.

FIG. 12 is a flowchart illustrating a generalized technique for using intra BC prediction mode during encoding or decoding when constrained infra prediction can be enabled.

FIG. 13 is a diagram illustrating example constraints on allowable BV values when constrained intra prediction is enabled.

FIG. 14 is a table illustrating an example approach to disabling intra BC prediction mode when constrained intra prediction is enabled.

FIGS. 16 and 17 are flowcharts illustrating generalized techniques for encoding and decoding, respectively, of BV values.

DETAILED DESCRIPTION

The detailed description presents innovations in the use of intra block copy ("BC") prediction mode during encoding. In particular, the detailed description presents innovations for concurrently performing block vector ("BV") estimation and making block splitting decisions for a block, and for selectively merging blocks into a larger block during BV estimation.

Although operations described herein are in places described as being performed by a video encoder, in many cases the operations can be performed by another type of media processing tool (e.g., image encoder).

Some of the innovations described herein are illustrated with reference to syntax elements and operations specific to the HEVC standard. For example, reference is made to the draft version JCTVC-N1005 of the HEVC standard—"High Efficiency Video Coding (HEVC) Range Extensions Text Specification: Draft 4," JCTVC-N1005, July 2013. The innovations described herein can also be implemented for other standards or formats.

More generally, various alternatives to the examples described herein are possible. For example, some of the methods described herein can be altered by changing the ordering of the method acts described, by splitting, repeating, or omitting certain method acts, etc. The various aspects of the disclosed technology can be used in combination or separately. Different embodiments use one or more of the described innovations. Some of the innovations described herein address one or more of the problems noted in the background. Typically, a given technique/tool does not solve all such problems.

I. Example Computing Systems.

Figure 1:
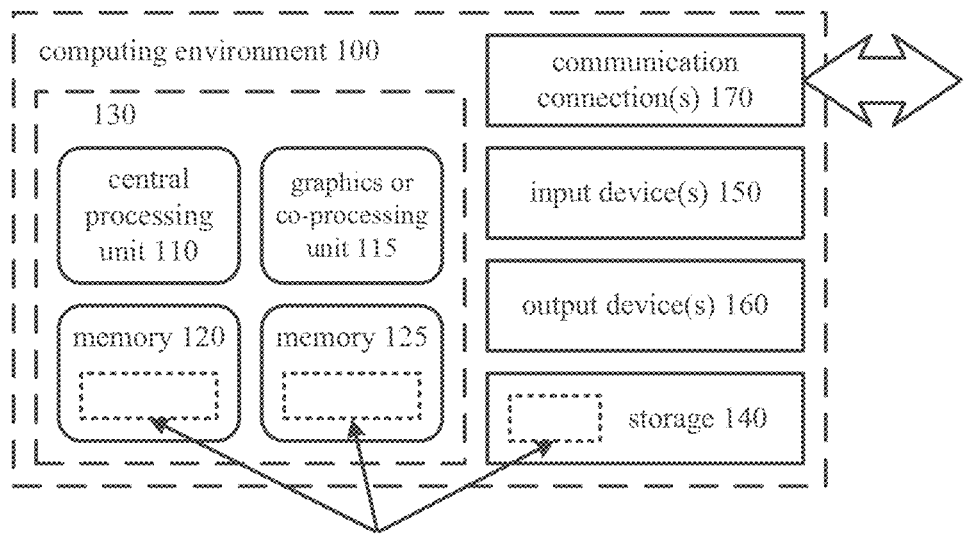
FIG. 1 is a diagram of an example computing system in which some described embodiments can be implemented.

FIG. 1 illustrates a generalized example of a suitable computing system (100) in which several of the described innovations may be implemented. The computing system (100) is not intended to suggest any limitation as to scope of use or functionality, as the innovations may be implemented in diverse general-purpose or special-purpose computing systems.

With reference to FIG. 1, the computing system (100) includes one or more processing units (110, 115) and memory (120, 125). The processing units (110, 115) execute computer-executable instructions. A processing unit can be a general-purpose central processing unit ("CPU"), processor in an application-specific integrated circuit ("ASIC") or any other type of processor. In a multi-processing system, multiple processing units execute computer-executable instructions to increase processing power. For example, FIG. 1 shows a central processing unit (110) as well as a graphics processing unit or co-processing unit (115). The tangible memory (120, 125) may be volatile memory (e.g., registers, cache, RAM), non-volatile memory (e.g., ROM, EEPROM, flash memory, etc.), or some combination of the two, accessible by the processing unit(s). The memory (120, 125) stores software (180) implementing one or more innovations for encoder-side options for intra BC prediction mode, in the form of computer-executable instructions suitable for execution by the processing unit(s).

A computing system may have additional features. For example, the computing system (100) includes storage (140), one or more input devices (150), one or more output devices (160), and one or more communication connections (170). An interconnection mechanism (not shown) such as a bus, controller, or network interconnects the components of the computing system (100). Typically, operating system software (not shown) provides an operating environment for other software executing in the computing system (100), and coordinates activities of the components of the computing system (100).

The tangible storage (140) may be removable or non-removable, and includes magnetic disks, magnetic tapes or cassettes, CD-ROMs, DVDs, or any other medium which can be used to store information and which can be accessed within the computing system (100). The storage (140) stores instructions for the software (180) implementing one or more innovations for encoder-side options for intra BC prediction mode.

The input device(s) (150) may be a touch input device such as a keyboard, mouse, pen, or trackball, a voice input device, a scanning device, or another device that provides input to the computing system (100). For video, the input device(s) (150) may be a camera, video card, TV tuner card, or similar device that accepts video input in analog or digital form, or a CD-ROM or CD-RW that reads video samples into the computing system (100). The output device(s) (160) may be a display, printer, speaker, CD-writer, or another device that provides output from the computing system (100).

The communication connection(s) (170) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-readable media. Computer-readable media are any available tangible media that can be accessed within a computing environment. By way of example, and not limitation, with the computing system (100), computer-readable media include memory (120, 125), storage (140), and combinations of any of the above.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

The disclosed methods can also be implemented using specialized computing hardware configured to perform any of the disclosed methods. For example, the disclosed methods can be implemented by an integrated circuit (e.g., an ASIC (such as an ASIC digital signal process unit ("DSP"), a graphics processing unit ("GPU"), or a programmable logic device ("PLD"), such as a field programmable gate array ("FPGA")) specially designed or configured to implement any of the disclosed methods.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation. As used herein, the term "optimiz*" (including variations such as optimization and optimizing) refers to a choice among options under a given scope of decision, and does not imply that an optimized choice is the "best" or "optimum" choice for an expanded scope of decisions.

II. Example Network Environments.

Figure 2A:
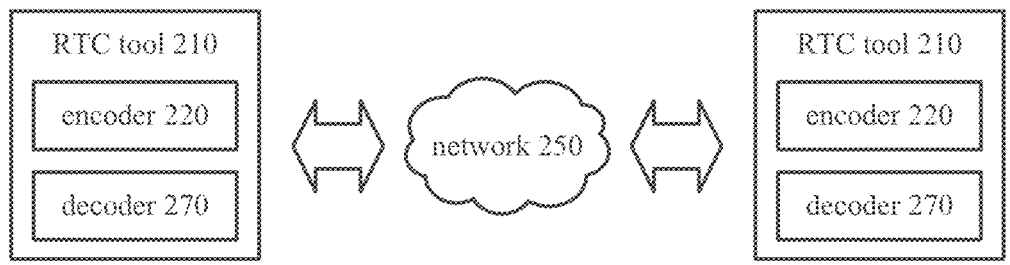
FIGS. 2a and 2b are diagrams of example network environments in which some described embodiments can be implemented.
Figure 2B:
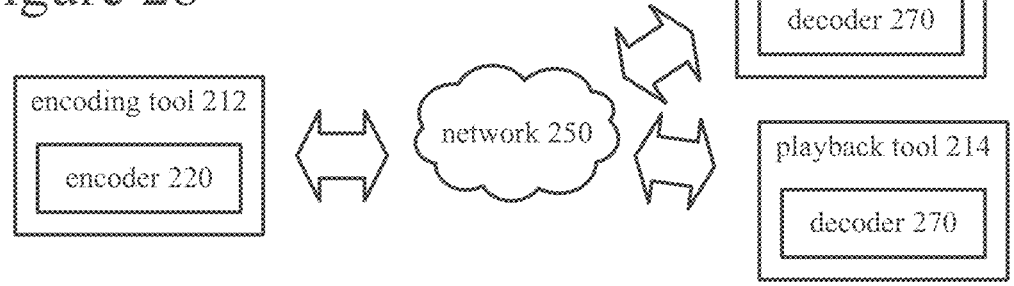

FIGS. 2a and 2b show example network environments (201, 202) that include video encoders (220) and video decoders (270). The encoders (220) and decoders (270) are connected over a network (250) using an appropriate communication protocol. The network (250) can include the Internet or another computer network.

In the network environment (201) shown in FIG. 2a, each real-time communication ("RTC") tool (210) includes both an encoder (220) and a decoder (270) for bidirectional communication. A given encoder (220) can produce output compliant with a variation or extension of the HEVC standard. SMPTE 421M standard, ISO-IEC 14496-10 standard (also known as H.264 or AVC), another standard, or a proprietary format, with a corresponding decoder (270) accepting encoded data from the encoder (220). The bidirectional communication can be part of a video conference, video telephone call, or other two-party communication scenario. Although the network environment (201) in FIG. 2a includes two real-time communication tools (210), the network environment (201) can instead include three or more real-time communication tools (210) that participate in multi party communication.

Figure 4:
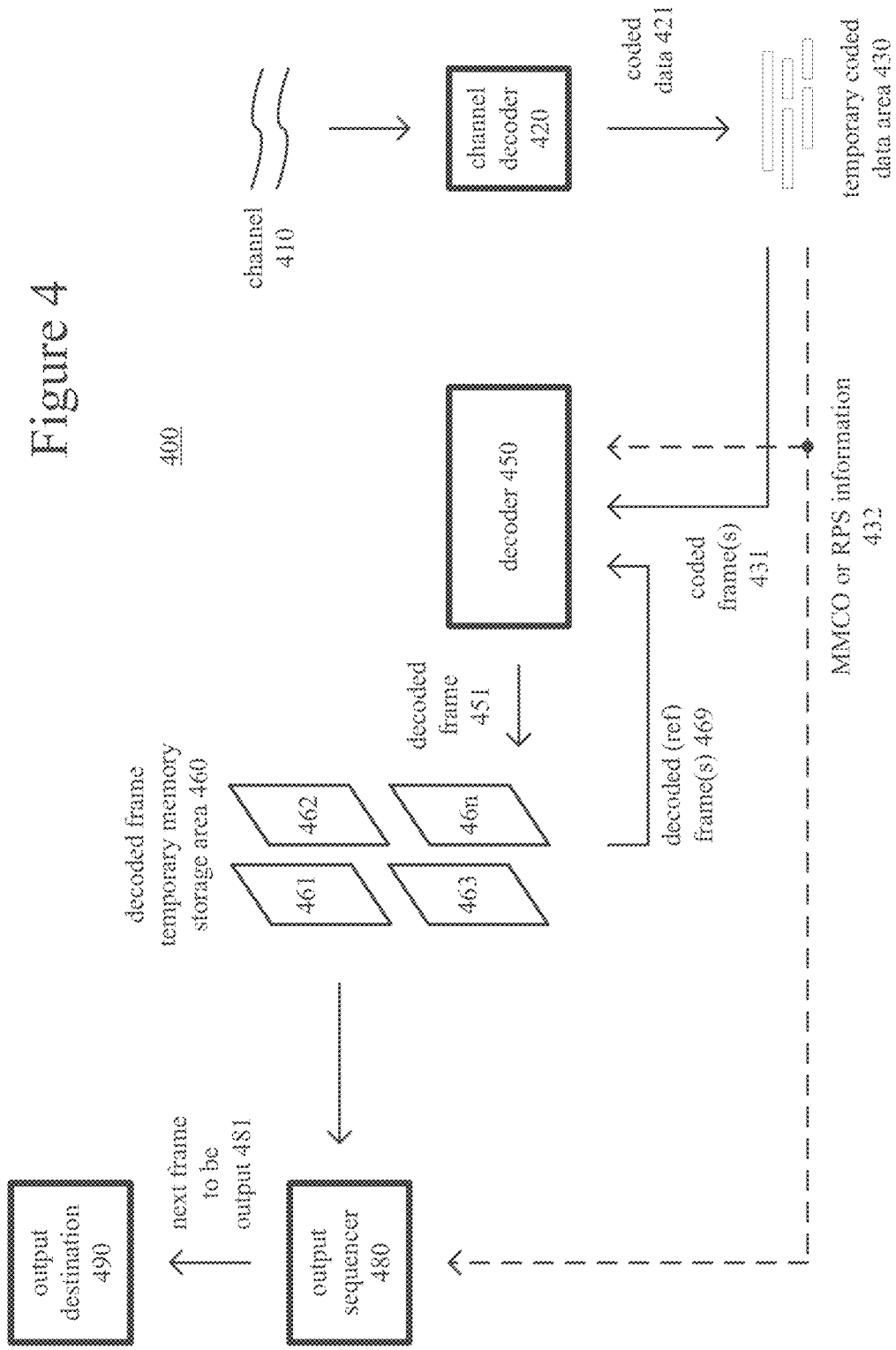
FIG. 4 is a diagram of an example decoder system.

A real-time communication tool (210) manages encoding by an encoder (220). FIG. 3 shows an example encoder system (300) that can be included in the real-time communication tool (210). Alternatively, the real-time communication tool (210) uses another encoder system. A real-time communication tool (210) also manages decoding by a decoder (270). FIG. 4 shows an example decoder system (400), which can be included in the real-time communication tool (210). Alternatively, the real-time communication tool (210) uses another decoder system.

In the network environment (202) shown in FIG. 2b, an encoding tool (212) includes an encoder (220) that encodes video for delivery to multiple playback tools (214), which include decoders (270). The unidirectional communication can be provided for a video surveillance system, web camera monitoring system, remote desktop conferencing presentation or other scenario in which video is encoded and sent from one location to one or more other locations. Although the network environment (202) in FIG. 2b includes two playback tools (214), the network environment (202) can include more or fewer playback tools (214). In general, a playback tool (214) communicates with the encoding tool (212) to determine a stream of video for the playback tool (214) to receive. The playback tool (214) receives the stream, buffers the received encoded data for an appropriate period, and begins decoding and playback.

FIG. 3 shows an example encoder system (300) that can be included in the encoding tool (212). Alternatively, the encoding tool (212) uses another encoder system. The encoding tool (212) can also include server-side controller logic for managing connections with one or more playback tools (214). FIG. 4 shows an example decoder system (400), which can be included in the playback tool (214). Alternatively, the playback tool (214) uses another decoder system. A playback tool (214) can also include client-side controller logic for managing connections with the encoding tool (212).

III. Example Encoder Systems.

FIG. 3 is a block diagram of an example encoder system (300) in conjunction with which some described embodiments may be implemented. The encoder system (300) can be a general-purpose encoding tool capable operating in any of multiple encoding modes such as a low-latency encoding mode for real-time communication, transcoding mode, and regular encoding mode for media playback from a file or stream, or it can be a special-purpose encoding tool adapted for one such encoding mode. The encoder system (300) can be implemented as an operating system module, as part of an application library or as a standalone application. Overall, the encoder system (300) receives a sequence of source video frames (311) from a video source (310) and produces encoded data as output to a channel (390). The encoded data output to the channel can include content encoded using intra BC prediction mode.

The video source (310) can be a camera, tuner card, storage media, or other digital video source. The video source (310) produces a sequence of video frames at a frame rate of, for example, 30 frames per second. As used herein, the term "frame" generally refers to source, coded or reconstructed image data. For progressive video, a frame is a progressive video frame. For interlaced video, in example embodiments, an interlaced video frame is de-interlaced prior to encoding. Alternatively, two complementary interlaced video fields are encoded as an interlaced video frame or separate fields. Aside from indicating a progressive video frame, the term "frame" or "picture" can indicate a single non-paired video field, a complementary pair of video fields, a video object plane that represents a video object at a given time, or a region of interest in a larger image. The video object plane or region can be part of a larger image that includes multiple objects or regions of a scene.

An arriving source frame (311) is stored in a source frame temporary memory storage area (320) that includes multiple frame buffer storage areas (321, 322, . . . , 32n). A frame buffer (321, 322, etc.) holds one source frame in the source frame storage area (320). After one or more of the source frames (311) have been stored in frame buffers (321, 322, etc.), a frame selector (330) periodically selects an individual source frame from the source frame storage area (320). The order in which frames are selected by the frame selector (330) tier input to the encoder (340) may differ from the order in which the frames are produced by the video source (310), e.g., a frame may be ahead in order, to facilitate temporally backward prediction. Before the encoder (340), the encoder system (300) can include a pre-processor (not shown) that performs pre-processing (e.g., filtering) of the selected frame (331) before encoding. The pre-processing can also include color space conversion into primary and secondary components for encoding. Typically, before encoding, video has been converted to a color space such as YUV, in which sample values of a luma (Y) component represent brightness or intensity values, and sample values of chroma (U, V) components represent color-difference values. The chroma sample values may be sub-sampled to a lower chroma sampling rate (e.g., for YUV 4:2:0 format), or the chroma sample values may have the same resolution as the luma sample values (e.g., for YUV 4:4:4 format). Or, the video can be encoded in another format (e.g., RGB 4:4:4 format).

The encoder (340) encodes the selected frame (331) to produce a coded frame (341) and also produces memory management control operation ("MMCO") signals (342) or reference picture set ("RPS") information. If the current frame is not the first frame that has been encoded, when performing its encoding process, the encoder (340) may use one or more previously encoded/decoded frames (369) that have been stored in a decoded frame temporary memory storage area (360). Such stored decoded frames (369) are used as reference frames for inter-frame prediction of the content of the current source frame (331). Generally, the encoder (340) includes multiple encoding modules that perform encoding tasks such as partitioning into tiles, intra prediction estimation and prediction, motion estimation and compensation, frequency transforms, quantization and entropy coding. The exact operations performed by the encoder (340) can vary depending on compression format. The format of the output encoded data can be a variation or extension of HEVC format, Windows Media Video format, VC-1 format, MPEG-x format (e.g., MPEG-1, MPEG-2, or MPEG-4), H.26x format (e.g., H.261, H.262, H.263, H.264), or another format.

The encoder (340) can partition a frame into multiple tiles of the same size or different sizes. For example, the encoder (340) splits the frame along tile rows and tile columns that, with frame boundaries, define horizontal and vertical boundaries of tiles within the frame, where each tile is a rectangular region. Tiles are often used to improve options for parallel processing. A frame can also be organized as one or more slices, where a slice can be an entire frame or region of the frame. A slice can be decoded independently of other slices in a frame, which improves error resilience. The content of a slice or tile is further partitioned into blocks or other sets of samples for purposes of encoding and decoding.

For syntax according to the HEVC standard, the encoder splits the content of a frame (or slice or tile) into coding tree units. A coding tree unit ("CTU") includes luma sample values organized as a luma coding tree block ("CTB") and corresponding chroma sample values organized as two chroma CTBs. The size of a CTU (and its CTBs) is selected by the encoder, and can be, for example, 64×64, 32×32 or 16×16 sample values. A CTU includes one or more coding units. A coding unit ("CU") has a luma coding block ("CB") and two corresponding chroma CBs. For example, a CTU with a 64×64 luma CTB and two 64×64 chroma CTBs (YUV 4:4:4 format) can be split into four CUs, with each CU including a 32×32 luma CB and two 32×32 chroma CBs, and with each CU possibly being split further into smaller CUs. Or, as another example, a CTU with a 64×64 luma CTB and two 32×32 chroma CTBs (YUV 4:2:0 format) can be split into four CUs, with each CU including a 32×32 luma CB and two 16×16 chroma CBs, and with each CU possibly being split further into smaller CUs. The smallest allowable size of CU (e.g., 8×8, 16×16) can be signaled in the bitstream.

Generally, a CU has a prediction mode such as inter or intra. A CU includes one or more prediction units for purposes of signaling of prediction information (such as prediction mode details, displacement values, etc.) and/or prediction processing. A prediction unit ("PU") has a tuna prediction block ("PB") and two chroma PBs. For an intra-predicted CU, the PU has the same size as the CU, unless the CU has the smallest size (e.g., 8×8). In that case, the CU can be split into four smaller PUs (e.g., each 4×4 if the smallest CU size is 8×8) or the PU can have the smallest CU size, as indicated by a syntax element for the CU. A CU also has one or more transform units for purposes of residual coding/decoding, where a transform unit ("TU") has a transform block ("TB") and two chroma TBs. A PU in an intra-predicted CU may contain a single TU (equal in size to the PU) or multiple TUs. As used herein, the term "block" can indicate a CB, PB, TB or other set of sample values, depending on context. The encoder decides how to partition video into CTUs, CUs, PUs, TUs, etc.

Returning to FIG. 3, the encoder represents an intra-coded block of a source frame (331) in terms of prediction from other, previously reconstructed sample values in the frame (331). For intra BC prediction, an intra-picture estimator estimates displacement of a block with respect to the other, previously reconstructed sample values. An intra-prediction reference region is a region of samples in the frame that are used to generate BC-prediction values for the block. For intra spatial prediction for a block, the intra-picture estimator estimates extrapolation of the neighboring reconstructed sample values into the block. The intra-prediction estimator outputs prediction information (such as block vector ("BV") values for intra BC prediction and prediction mode (direction) for intra spatial prediction), which is entropy coded. An intra-prediction predictor applies the prediction information to determine intra prediction values.

The encoder (340) represents an inter-coded, predicted block of a source frame (331) in terms of prediction from reference frames. A motion estimator estimates motion of the block with respect to one or more reference frames (369). When multiple reference frames are used, the multiple reference frames can be from different temporal directions or the same temporal direction. A motion-compensated prediction reference region is a region of samples in the reference frame(s) that are used to generate motion-compensated prediction values for a block of samples of a current frame. The motion estimator outputs motion information such as motion vector information, which is entropy coded. A motion compensator applies motion vectors to reference frames (369) to determine motion-compensated prediction values.

The encoder determines the differences (if any) between a block's prediction values (infra or inter) and corresponding original values. These prediction residual values are further encoded using a frequency transform, quantization and entropy encoding. For example, the encoder (340) sets values tier quantization parameter ("QP") fir a picture, tile, slice and/or other portion of video, and quantizes transform coefficients accordingly. The entropy coder of the encoder (340) compresses quantized transform coefficient values as well as certain side information (e.g., motion vector information, BV values, QP values, mode decisions, parameter choices). Typical entropy coding techniques include Exp-Golomb coding, arithmetic coding, differential coding, Huffman coding, run length coding, variable-length-to-variable-length ("V2V") coding, variable-length-to-fixed-length ("V2F") coding, LZ coding, dictionary coding, probability interval partitioning entropy coding ("PIPE"), and combinations of the above. The entropy coder can use different coding techniques for different kinds of information, and can choose from among multiple code tables within a particular coding technique.

The coded frames (341) and MMCO/RPS information (342) are processed by a decoding process emulator (350). The decoding process emulator (350) implements some of the functionality of a decoder, for example, decoding tasks to reconstruct reference frames. The decoding process emulator (350) uses the MMCO/RPS information (342) to determine whether a given coded frame (341) needs to be reconstructed and stored for use as a reference frame in inter-frame prediction of subsequent frames to be encoded. If the MMCO/RPS information (342) indicates that a coded frame (341) needs to be stored, the decoding process emulator (350) models the decoding process that would be conducted by a decoder that receives the coded frame (341) and produces a corresponding decoded frame (351). In doing so, when the encoder (340) has used decoded frame(s) (369) that have been stored in the decoded frame storage area (360), the decoding process emulator (350) also uses the decoded frame(s) (369) from the storage area (360) as part of the decoding process.

The decoded frame temporary memory storage area (360) includes multiple frame buffer storage areas (361, 362, . . . , 36n). The decoding process emulator (350) uses the MMCO/RPS information (342) to manage the contents of the storage area (360) in order to identify any frame buffers (361, 362, etc.) with frames that are no longer needed by the encoder (340) for use as reference frames. After modeling the decoding process, the decoding process emulator (350) stores a newly decoded frame (351) in a frame buffer (361, 362, etc.) that has been identified in this manner.

The coded frames (341) and MMCO/RPS information (342) are buffered in a temporary coded data area (370). The coded data that is aggregated in the coded data area (370) contains, as part of the syntax of an elementary coded video bitstream, encoded data for one or more pictures. The coded data that is aggregated in the coded data area (370) can also include media metadata relating to the coded video data (e.g., as one or more parameters in one or more supplemental enhancement information ("SEI") messages or video usability information ("VUI") messages).

The aggregated data (371) from the temporary coded data area (370) are processed by a channel encoder (380). The channel encoder (380) can packetize the aggregated data for transmission as a media stream (e.g., according to a media stream multiplexing format such as ISO/IEC 13818-1), in which case the channel encoder (380) can add syntax elements as part of the syntax of the media transmission stream. Or, the channel encoder (380) can organize the aggregated data for storage as a file (e.g., according to a media container format such as ISO/IEC 14496-12), in which case the channel encoder (380) can add syntax dements as part of the syntax of the media storage file. Or, more generally, the channel encoder (380) can implement one or more media system multiplexing protocols or transport protocols, in which case the channel encoder (380) can add syntax elements as part of the syntax of the protocol(s). The channel encoder (380) provides output to a channel (390), which represents storage, a communications connection, or another channel for the output.

IV. Example Decoder Systems.

FIG. 4 is a block diagram of an example decoder system (400). The decoder system (400) can be a general-purpose decoding tool capable of operating in any of multiple decoding modes such as a low-latency decoding mode for real-time communication and regular decoding mode for media playback from a file or stream, or it can be a special-purpose decoding tool adapted for one such decoding mode. The decoder system (400) can be implemented as an operating system module, as part of an application library or as a standalone application. Overall, the decoder system (400) receives coded data from a channel (410) and produces reconstructed frames as output for an output destination (490). The coded data can include content encoded using intra BC prediction mode.

The decoder system (400) includes a channel (410), which can represent storage, a communications connection, or another channel for coded data as input. The channel (410) produces coded data that has been channel coded. A channel decoder (420) can process the coded data. For example, the channel decoder (420) de-packetizes data that has been aggregated for transmission as a media stream (e.g., according to a media stream multiplexing format such as ISO/IEC 13818-1), in which case the channel decoder (420) can parse syntax elements added as part of the syntax of the media transmission stream. Or, the channel decoder (420) separates coded video data that has been aggregated for storage as a file (e.g., according to a media container format such as ISO/IEC 14496-12), in which case the channel decoder (420) can parse syntax elements added as part of the syntax of the media storage tile. Or, more generally, the channel decoder (420) can implement one or more media system demultiplexing protocols or transport protocols, in which case the channel decoder (420) can pane syntax elements added as part of the syntax of the protocol(s).

The coded data (421) that is output from the channel decoder (420) is stored in a temporary coded data area (430) until a sufficient quantity of such data has been received. The coded data (421) includes coded frames (431) and MMCO/RPS information (432). The coded data (421) in the coded data area (430) contain, as part of the syntax of an elementary coded video bitstream, coded data for one or more pictures. The coded data (421) in the coded data area (430) can also include media metadata relating to the encoded video data (e.g., as one or more parameters in one or more SEI messages or VUI messages).

In general, the coded data area (430) temporarily stores coded data (421) until such coded data (421) is used by the decoder (450). At that point, coded data for a coded frame (431) and MMCO/RPS information (432) are transferred from the coded data area (430) to the decoder (450). As decoding continues, new coded data is added to the coded data area (430) and the oldest coded data remaining in the coded data area (430) is transferred to the decoder (450).

The decoder (450) periodically decodes a coded frame (431) to produce a corresponding decoded frame (451). As appropriate, when performing its decoding process, the decoder (450) may use one or more previously decoded frames (469) as reference frames for inter-frame prediction. The decoder (450) reads such previously decoded frames (469) from a decoded frame temporary memory storage area (460). Generally, the decoder (450) includes multiple decoding modules that perform decoding tasks such as entropy decoding, inverse quantization, inverse frequency transforms, intra prediction, motion compensation and merging of tiles. The exact operations performed by the decoder (450) can vary depending on compression format.

For example, the decoder (450) receives encoded data for a compressed frame or sequence of frames and produces output including decoded frame (451). In the decoder (450), a buffer receives encoded data for a compressed frame and, at an appropriate time, makes the received encoded data available to an entropy decoder. The entropy decoder entropy decodes entropy-coded quantized data as well as entropy-coded side information, typically applying the inverse of entropy encoding performed in the encoder. A motion compensator applies motion information to one or more reference frames to form motion-compensated prediction values for any inter-coded blocks of the frame being reconstructed. An intra prediction module can spatially predict sample values of a current block from neighboring, previously reconstructed sample values or, for intra BC, prediction, predict sample values of a current block using previously reconstructed sample values of an intra-prediction region in the frame. The decoder (450) also reconstructs prediction residuals. An inverse quantizer inverse quantizes entropy-decoded data. For example, the decoder (450) sets values for QP for a picture, tile, slice and/or other portion of video based on syntax elements in the bitstream, and inverse quantizes transform coefficients accordingly. An inverse frequency transformer converts the quantized, frequency domain data into spatial domain information. For an inter-predicted block, the decoder (450) combines reconstructed prediction residuals with motion-compensated predictions. The decoder (450) can similarly combine prediction residuals with predictions from intra prediction. A motion compensation loop in the video decoder (450) includes an adaptive de-blocking filter to smooth discontinuities across block boundary rows and/or columns in the decoded frame (451).

The decoded frame temporary memory storage area (460) includes multiple frame buffer storage areas (461, 462, . . . , 46n). The decoded frame storage area (460) is an example of a decoded picture buffer. The decoder (450) uses the MMCO/RPS information (432) to identify a frame buffer (461, 462, etc.) in which it can store a decoded frame (451). The decoder (450) stores the decoded frame (451) in that frame buffer.

An output sequencer (480) uses the MMCO/RPS information (432) to identify when the next frame to be produced in output order is available in the decoded frame storage area (460). When the next frame (481) to be produced in output order is available in the decoded frame storage area (460), it is read by the output sequencer (480) and output to the output destination (490) (e.g., display). In general, the order in which frames are output from the decoded frame storage area (460) by the output sequencer (480) may differ from the order in which the frames are decoded by the decoder (450).

V. Example Video Encoders.

Figure 5A:
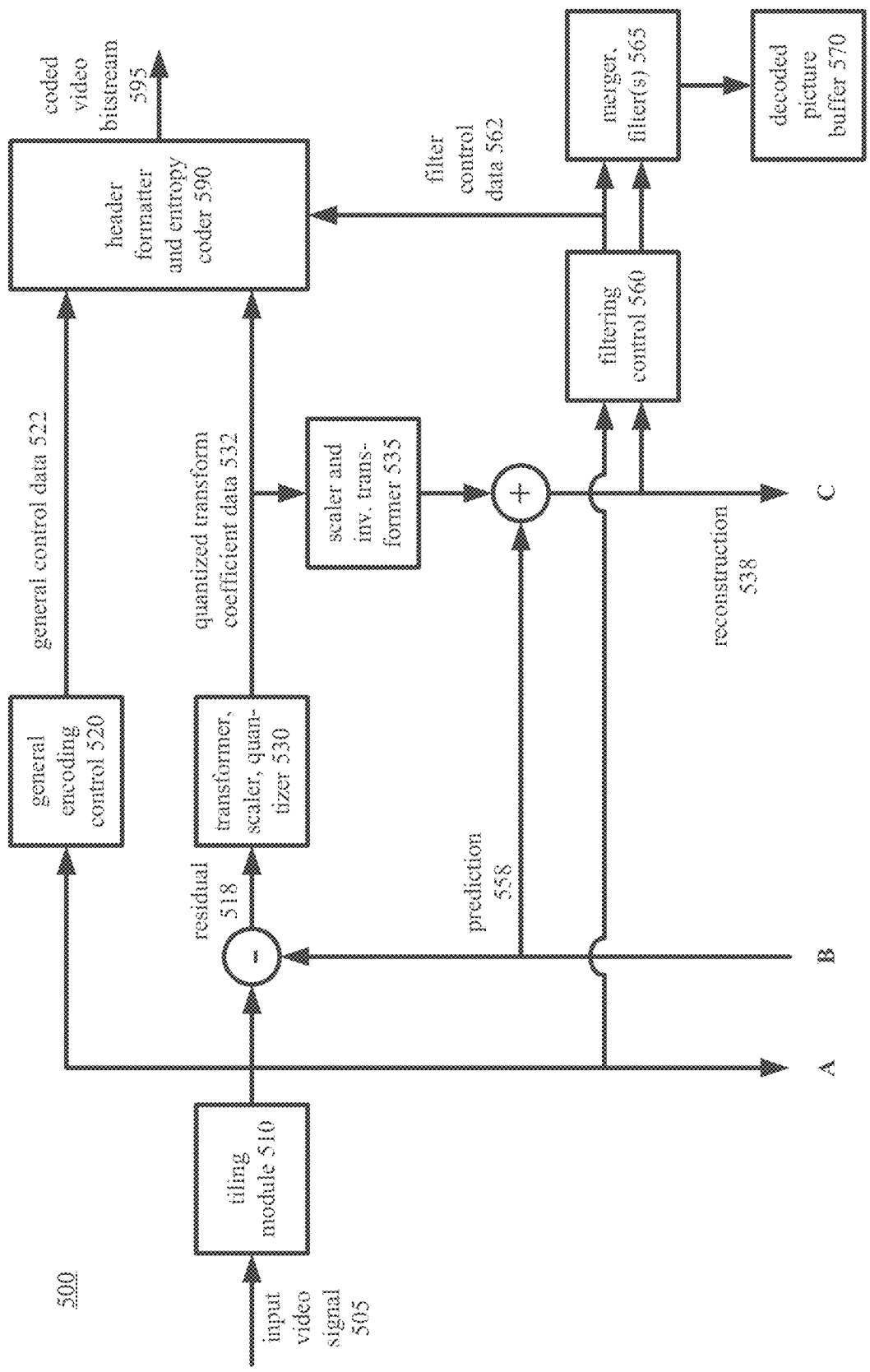
FIGS. 5a and 5b are diagrams illustrating an example video encoder in conjunction with which some described embodiments can be implemented.
Figure 5B:
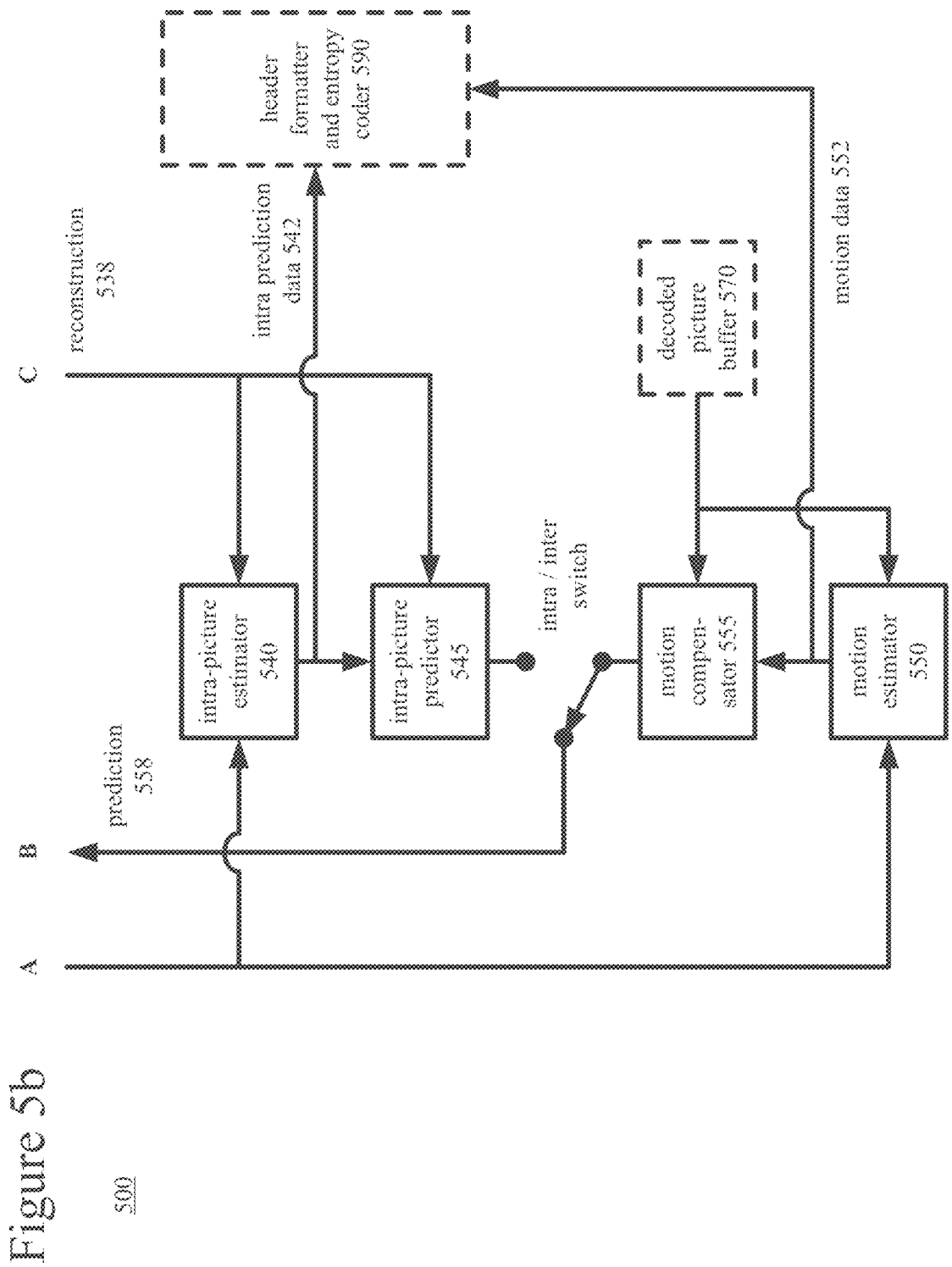

FIGS. 5a and 5b are a block diagram of a generalized video encoder (500) in conjunction with which some described embodiments may be implemented. The encoder (500) receives a sequence of video pictures including a current picture as an input video signal (50S) and produces encoded data in a coded video bitstream (595) as output.

The encoder (500) is block-based and uses a block format that depends on implementation. Blocks may be further sub-divided at different stages, e.g., at the prediction, frequency transform and/or entropy encoding stages. For example, a picture can be divided into 64×64 blocks, 32×32 blocks or 16×16 blocks, which can in turn be divided into smaller blocks of sample values for coding and decoding. In implementations of encoding for the HEVC standard, the encoder partitions a picture into CTUs (CTBs), CUs (CBs), PUs (PBs) and TU (TBs).

The encoder (500) compresses pictures using intra-picture coding and/or inter-picture coding. Many of the components of the encoder (500) are used for both intra-picture coding and inter-picture coding. The exact operations performed by those components can vary depending on the type of information being compressed.

A tiling module (510) optionally partitions a picture into multiple tiles of the same size or different sizes. For example, the tiling module (510) splits the picture along tile rows and tile columns that, with picture boundaries, define horizontal and vertical boundaries of tiles within the picture, where each tile is a rectangular region. The tiling module (510) can then group the tiles into one or more tile sets, where a tile set is a group of one or more of the tiles.

The general encoding control (520) receives pictures for the input video signal (505) as well as feedback (not shown) from various modules of the encoder (500). Overall, the general encoding control (520) provides control signals (not shown) to other modules (such as the tiling module (510), transformer/scaler/quantizer (530), scaler/inverse transformer (535), intra-picture estimator (540), motion estimator (550) and intra/inter switch) to set and change coding parameters during encoding. In particular, the general encoding control (520) can decide whether and how to use intra BC prediction during encoding. The general encoding control (520) can also evaluate intermediate results during encoding, for example, performing rate-distortion analysis. The general encoding control (520) produces general control data (522) that indicates decisions made during encoding, so that a corresponding decoder can make consistent decisions. The general control data (522) is provided to the header formatter/entropy coder (590).

If the current picture is predicted using inter-picture prediction, a motion estimator (550) estimates motion of blocks of sample values of the current picture of the input video signal (505) with respect to one or more reference pictures. The decoded picture buffer (570) buffers one or more reconstructed previously coded pictures for use as reference pictures. When multiple reference pictures are used, the multiple reference pictures can be from different temporal directions or the same temporal direction. The motion estimator (550) produces as side information motion data (552) such as motion vector data and reference picture selection data. The motion data (552) is provided to the header formatter/entropy coder (590) as well as the motion compensator (555).

The motion compensator (555) applies motion vectors to the reconstructed reference picture(s) from the decoded picture buffer (570). The motion compensator (555) produces motion-compensated predictions for the current picture.

In a separate path within the encoder (500), an intra-picture estimator (540) determines how to perform intra-picture prediction for blocks of sample values of a current picture of the input video signal (505). The current picture can be entirely or partially coded using intra-picture coding. Using values of a reconstruction (538) of the current picture, for intra spatial prediction, the intra-picture estimator (540) determines how to spatially predict sample values of a current block of the current picture from neighboring, previously reconstructed sample values of the current picture. Or, for intra BC prediction, the intra-picture estimator (540) estimate displacement of the sample values of the current block to different candidate regions within the current picture. For intra BC prediction, the intra-prediction estimator (540) can constrain the BV selection process using one or more constraints described below. The intra-prediction estimator (540) can also limit use of intra BC prediction when constrained intra prediction is enabled, as described below.

The intra-prediction estimator (540) produces as side information intra prediction data (542), such as information indicating whether intra prediction uses spatial prediction or BC prediction (e.g., a flag value per intra block), prediction mode direction (tor intra spatial prediction) and BV values (for infra BC prediction). The intra prediction data (542) is provided to the header formatter/entropy coder (590) as well as the intra-picture predictor (545).

According to the intra prediction data (542), the intra-picture predictor (545) spatially predicts sample values of a current block of the current picture from neighboring, previously reconstructed sample values of the current picture. Or, for intra BC prediction, the intra-picture predictor (545) predicts the sample values of the current block using previously reconstructed sample values of an intra-prediction region, which is indicated by a BV value for the current block. When the chroma data tier a picture has the same resolution as the luma data (e.g. when the format is YUV 4:4:4 format or RGB 4:4:4 format), the BV value that is applied for the chroma block may be the same as the BV value applied for the luma block. On the other hand, when the chroma data for a picture has reduced resolution relative to the luma data (e.g. when the format is YUV 4:2:0 format), the BV value that is applied for the chroma block may be scaled down and possibly rounded to adjust for the difference in chroma resolution (e.g. by dividing the vertical and horizontal components of the BV value by two and truncating or rounding them to integer values).

The intra/inter switch selects values of a motion-compensated prediction or intra-picture prediction for use as the prediction (558) for a given block. The difference (if any) between a block of the prediction (558) and corresponding part of the original current picture of the input video signal (505) provides values of the residual (518). During reconstruction of the current picture, reconstructed residual values are combined with the prediction (558) to produce a reconstruction (538) of the original content from the video signal (505). In lossy compression, however, some information is still lost from the video signal (505).

In the transformer/scaler/quantizer (530), a frequency transformer converts spatial domain video information into frequency domain (i.e., spectral, transform) data. For block-based video coding, the frequency transformer applies a discrete cosine transform ("DCT"), an integer approximation thereof, or another type of forward block transform to blocks of prediction residual data (or sample value data if the prediction (558) is null), producing blocks of frequency transform coefficients. When intra BC prediction is used, the encoder (500) can apply a discrete sine transform ("DST"), an integer approximation thereof or other type of forward block transform (that is different than the transform applied for other blocks) for at least some sizes of blocks of intra BC prediction residual values, as described below. The encoder (500) may also be able to indicate that such transform step is skipped. The scaler/quantizer scales and quantizes the transform coefficients. For example, the quantizer applies non-uniform, scalar quantization to the frequency domain data with a step size that varies on a frame-by-frame basis, tile-by-tile basis, slice-by-slice basis, block-by-block basis or other basis. The quantized transform coefficient data (532) is provided to the header formatter/entropy coder (590).

In the scaler/inverse transformer (535), a scaler/inverse quantizer performs inverse scaling and inverse quantization on the quantized transform coefficients. An inverse frequency transformer performs an inverse frequency transform, producing blocks of reconstructed prediction residuals or sample values. The encoder (500) combines reconstructed residuals with values of the prediction (558) (e.g., motion-compensated prediction values, intra-picture prediction values) to form the reconstruction (538).

For intra-picture prediction, the values of the reconstruction (538) can be fed hack to the intra-picture estimator (540) and intra-picture predictor (545). Also, the values of the reconstruction (538) can be used for motion-compensated prediction of subsequent pictures. The values of the reconstruction (538) can be further filtered. A filtering control (560) determines how to perform deblock filtering and sample adaptive onset ("SAO") filtering on values of the reconstruction (538), fora given picture of the video signal (505). The filtering control (560) produces filter control data (562), which is provided to the header formatter/entropy coder (590) and merger/filter(s) (565).

In the merger/tilter(s) (565), the encoder (500) merges content from different tiles into a reconstructed version of the picture. The encoder (500) selectively performs deblock filtering and SAO filtering according to the filter control data (562), so as to adaptively smooth discontinuities across boundaries in the frames. The encoder (500) can apply different approaches when in-loop deblock filtering the boundaries between blocks of a picture, depending on whether prediction mode is intra spatial prediction, intra BC prediction or inter prediction for the respective blocks, as described below. Tile boundaries can be selectively filtered or not filtered at all, depending on settings of the encoder (500), and the encoder (500) may provide syntax within the coded bitstream to indicate whether or not such filtering was applied. The decoded picture buffer (570) buffers the reconstructed current picture for use in subsequent motion-compensated prediction.

The header formatter/entropy coder (590) formats and/or entropy codes the general control data (522), quantized transform coefficient data (532), intra prediction data (542), motion data (552) and filter control data (562). For example, the header formatter/entropy coder (590) uses context-adaptive binary arithmetic coding for entropy coding of various syntax elements. In particular, when it encodes a BV value, the header formatter/entropy coder (590) can exploit the probabilities of occurrence of values for one component of the BV (e.g., horizontal component) considering the value of the other component of the BV (e.g., vertical component), as described below.

The header formatter/entropy coder (590) provides the encoded data in the coded video bitstream (595). The format of the coded video bitstream (595) can be a variation or extension of HEVC format, Windows Media Video format, VC-1 format, MPEG-x format (e.g., MPEG-1, MPEG-2, or MPEG-4), H.26x format (e.g., H.261, H.262, H.263, H.264), or another format.

Depending on implementation and the type of compression desired, modules of the encoder can be added, omitted, split into multiple modules, combined with other modules, and/or replaced with like modules. In alternative embodiments, encoders with different modules and/or other configurations of modules perform one or more of the described techniques. Specific embodiments of encoders typically use a variation or supplemented version of the encoder (500). The relationships shown between modules within the encoder (500) indicate general flows of information in the encoder; other relationships are not shown for the sake of simplicity.

VI. Example Video Decoders.

Figure 6:
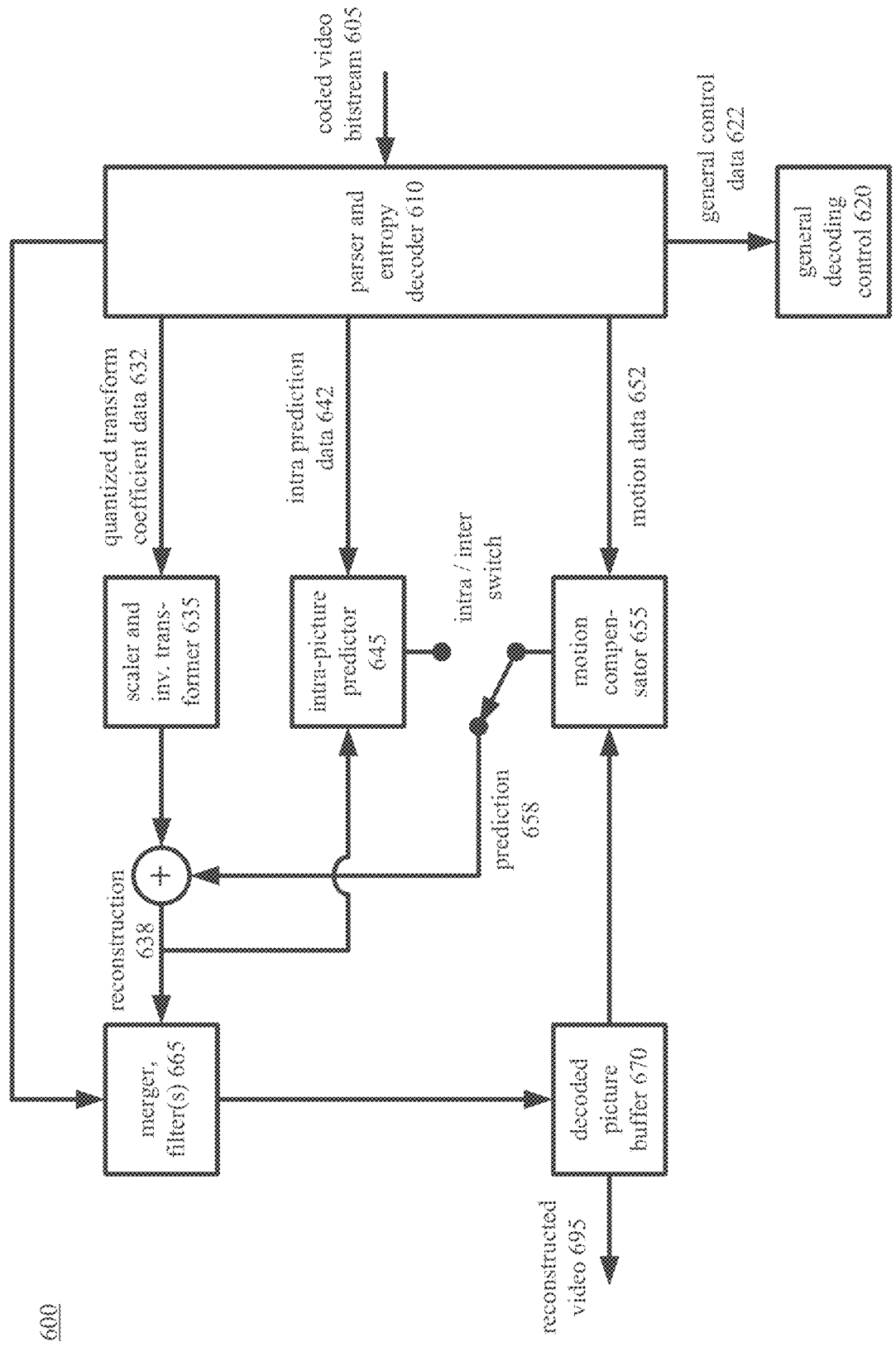
FIG. 6 is a diagram illustrating an example video decoder.

FIG. 6 is a block diagram of a generalized decoder (600). The decoder (600) receives encoded data in a coded video bitstream (605) and produces output including pictures for reconstructed video (695). The format of the coded video bitstream (605) can be a variation or extension of HEVC format, Windows Media Video format, VC-1 format, MPEG-x format (e.g., MPEG-1, MPEG-2, or MPEG-4). H.26x format (e.g., H.261, H.262, H.263, H.264), or another format.

The decoder (600) is block-based and uses a block format that depends on implementation. Blocks may be further sub-divided at different stages. For example, a picture can be divided into 64×64 blocks, 32×32 blocks or 16×16 blocks, which can in turn be divided into smaller blocks of sample values. In implementations of decoding for the HEVC standard, a picture is partitioned into CTUs (CTBs), CUs (CBs), PUs (PBs) and TV (TBs).

The decoder (600) decompresses pictures using intra-picture decoding and/or inter-picture decoding. Many of the components of the decoder (600) are used for both intra-picture decoding and inter-picture decoding. The exact operations performed by those components can vary depending on the type of information being decompressed.

A buffer receives encoded data in the coded video bitstream (605) and makes the received encoded data available to the parser/entropy decoder (610). The parser/entropy decoder (610) entropy decodes entropy-coded data, typically applying the inverse of entropy coding performed in the encoder (500) (e.g., context-adaptive binary arithmetic decoding). In particular, when it decodes a BV value, the parser/entropy decoder (610) can decode the respective components of the BV as described below. As a result of parsing and entropy decoding, the parser/entropy decoder (610) produces general control data (622), quantized transform coefficient data (632), intra prediction data (642), motion data (652) and filter control data (662).

The general decoding control (620) receives the general control data (622) and provides control signals (not shown) to other modules (such as the scaler/inverse transformer (635), intra-picture predictor (645), motion compensator (655) and intra/inter switch) to set and change decoding parameters during decoding.

If the current picture is predicted using inter-picture prediction, a motion compensator (655) receives the motion data (652), such as motion vector data and reference picture selection data. The motion compensator (655) applies motion vectors to the reconstructed reference picture(s) from the decoded picture buffer (670). The motion compensator (655) produces motion-compensated predictions for inter-coded blocks of the current picture. The decoded picture buffer (670) stores one or more previously reconstructed pictures for use as reference pictures.

In a separate path within the decoder (600), the intra-prediction predictor (645) receives the intra prediction data (642), such as information indicating whether intra prediction uses spatial prediction or BC prediction (e.g., a flag value per intra block), prediction mode direction (for intra spatial prediction) and BV values (for intra BC prediction). For intra spatial prediction, using values of a reconstruction (638) of the current picture, according to prediction mode data, the intra-picture predictor (645) spatially predicts sample values of a current block of the current picture from neighboring, previously reconstructed sample values of the current picture. Or, for intra BC prediction, the intra-picture predictor (645) predicts the sample values of the current block using previously reconstructed sample values of an intra-prediction region, which is indicated by a BV value for the current block. The intra-picture predictor (645) can also limit use of intra BC prediction when constrained intra prediction is enabled, as described below.

The intra/inter switch selects values of a motion-compensated prediction or intra-picture prediction for use as the prediction (658) for a given block. For example, when HEVC syntax is followed, the intra/inter switch can be controlled based on a syntax element encoded for a CU of a picture that can contain intra-predicted CUs and inter-predicted (Us. The decoder (600) combines the prediction (658) with reconstructed residual values to produce the reconstruction (638) of the content from the video signal.

To reconstruct the residual, the scaler/inverse transformer (635) receives and processes the quantized transform coefficient data (632). In the scaler/inverse transformer (635), a scaler/inverse quantizer performs inverse scaling and inverse quantization on the quantized transform coefficients. An inverse frequency transformer performs an inverse frequency transform, producing blocks of reconstructed prediction residuals or sample values. For example, the inverse frequency transformer applies an inverse block transform to frequency transform coefficients, producing sample value data or prediction residual data. The inverse frequency transform can be an inverse DCT, an integer approximation thereof, or another type of inverse frequency transform. When intra BC prediction is used, the decoder (600) can apply an inverse DST, an integer approximation thereof or other type of inverse block transform (that is different than the transform applied for other blocks) for at least some sizes of blocks of intra BC prediction residual values, as described below.

For intra-picture prediction, the values of the reconstruction (638) can be fed back to the intra-picture predictor (645). For inter-picture prediction, the values of the reconstruction (638) can be further filtered. In the merger/filter(s) (665), the decoder (600) merges content from different tiles into a reconstructed version of the picture. The decoder (600) selectively performs deblock filtering and SAO filtering according to the filter control data (662) and rules for filter adaptation, so as to adaptively smooth discontinuities across boundaries in the frames. The decoder (600) can apply different approaches when in-loop deblock filtering the boundaries between blocks of a picture, depending on whether prediction mode is intra spatial prediction, intra BC prediction or inter prediction for the respective blocks, as described below. Tile boundaries can be selectively filtered or not filtered at all, depending on settings of the decoder (600) or a syntax indication within the encoded bitstream data. The decoded picture buffer (670) buffers the reconstructed current picture for use in subsequent motion-compensated prediction.

The decoder (600) can also include a post-processing deblock filter. The post-processing deblock filter optionally smoothes discontinuities in reconstructed pictures. Other filtering (such as do-ring filtering) can also be applied as part of the post-processing filtering.

Depending on implementation and the type of decompression desired, modules of the decoder can be added, omitted, split into multiple modules, combined with other modules, and/or replaced with like modules. In alternative embodiments, decoders with different modules and/or other configurations of modules perform one or more of the described techniques. Specific embodiments of decoders typically use a variation or supplemented version of the decoder (600). The relationships shown between modules within the decoder (600) indicate general flows of information in the decoder; other relationships are not shown for the sake of simplicity.

VII. Intra Block Copy Prediction Mode.

This section presents various features of intra block copy ("BC") prediction mode. Some of the features relate to selection of block vector ("BV") values, while others relate to encoding/decoding of BV values. Still others relate to integration of intra BC prediction mode with constrained intra prediction, selection of forward and inverse frequency transforms when intra BC prediction mode has been used, or in-loop deblock filtering across a boundary of a block with intra BC prediction mode. These features can facilitate intra BC prediction that is more effective in terms of rate-distortion performance and/or computational efficiency of encoding and decoding. In particular, intra BC prediction can improve rate-distortion performance when encoding certain "artificially" created video content such as screen-capture content. Screen-capture content typically includes repeated structures (e.g., graphics, text characters), which provide opportunities for intra BC prediction to improve performance. Screen capture content is usually encoded in a format (e.g., YUV 4:4:4 or RGB 4:4:4) with high chroma sampling resolution, although it may also be encoded in a format with lower chroma sampling resolution (e.g., YUV 4:2:0).

A. Intra BC Prediction Mode—Introduction.

For intra BC prediction mode, the sample values of a current block of a picture are predicted using sample values in the same picture. A BV indicates a displacement from the current block to a region of the picture that includes the sample values used for prediction. Typically, the sample values used for prediction are previously reconstructed sample values. The BV is signaled in the bitstream. Intra BC prediction is a form of intra-picture prediction intra BC prediction for a block of a picture does not use any sample values other than sample values in the same picture.

Figure 7:
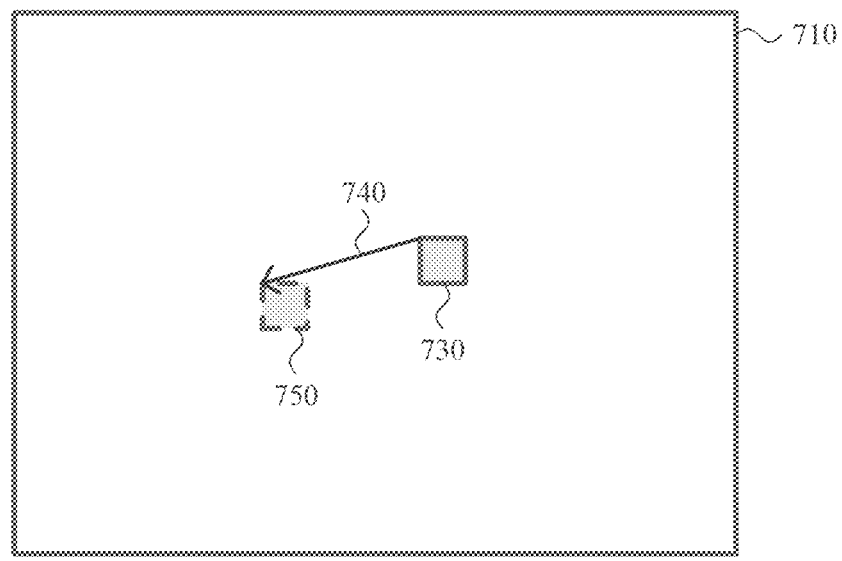
FIG. 7 is diagram illustrating intra BC prediction for a block of picture.

FIG. 7 illustrates intra BC prediction for a current block (730) of a current frame (710). The current block can be a coding block ("CB") of a coding unit ("CU"), prediction block ("PB") of a prediction unit ("PU"), transform block ("TB") of a transform unit ("TV") or other block. The size of the current block can be 64×64, 32×32, 6×16, 8×8 or some other size. More generally, the size of the current block is in m×n, where each of m and n is a whole number, and where m and n can be equal to each other or can have different values. Alternatively, the current block can have some other shape (e.g., an area of a coded video object with a non-rectangular shape).

The BV (740) indicates a displacement (or offset) from the current block (730) to a region (750) of the picture that includes the sample values used for prediction. Suppose the top left position of a current block is at position $(x_0, y_0)$ in the current frame, and suppose the top left position of the intra-prediction region is at position $(x_1, y_1)$ in the current frame. The BV indicates the displacement $(x_1-x_0, y_1-y_0)$. For example, if the top left position of the current block is at position (320, 256), and the top left position of the intra-prediction region is at position (295, 270), the BV value is (−25, 14). A negative horizontal displacement indicates a position to the left of the current block, and a negative vertical displacement indicates a position above the current block.

In some example implementations, the intra-predicted region (750) is constrained to be within the same slice and tile as the current block (730). Such intra BC prediction does not use sample values in other slices or tiles. The location of the intra-predicted region (750) may be subject to one or more other constraints (e.g., for search range, regarding use of reconstructed sample values of inter-coded blocks).

A block with prediction mode of intra BC prediction can be a CB, PB or other block. When the block is a CB, the BV for the block can be signaled at CU level (and other CBs in the CU use the same BV or a scaled version thereof). Or, when the block is a PB, the BV for the block can be signaled at PU level (and other PBs in the PU use the same BV or a scaled version thereof). More generally, the BV for an intra-BC prediction block is signaled at an appropriate syntax level for the block.

The block copying operations of prediction according to the intra BC prediction mode can be performed at the level of CB (when a BV is signaled per CB) or PB (when a BV is signaled per PB). For example, suppose a 16×16 CB has a single 16×16 PB. The BV (for the PB) is applied to block copy a 16×16 region. When the intra-prediction region is constrained to not overlap the 16×16 block being predicted, the BV has a magnitude (absolute value) of at least 16 horizontally or vertically.

Alternatively, the block copying operations can be performed at the level of TBs within a PB or CB, even when the BV is signaled for the PB or CB. In this way, a βV, as applied for a TB, can reference positions of other TBs in the same PB or CB. For example, suppose a 16×16 CB has a single 16×16 PB but is split into sixteen 4×4 TBs for purposes of residual coding/decoding. The BV (for the PB) is applied to block copy a 4×4 region for the first TB in raster scan order, then the same BV is applied to block copy a 4×4 region for the second TB in raster scan order, and so on. The 4×4 region used in the BC operations for a TB can include positions in previously reconstructed TBs in the same CB, after combining residual values with predicted values for those previously reconstructed TBs. (A BV still does not reference positions in the same TB that is being predicted). Applying BC operations at the TB level facilitates use of BVs with relatively small magnitudes.

Intra BC prediction operations for chroma blocks of a CU generally correspond to intra BC prediction operations for the luma block of the CU. Normally, the segmentation of chroma PBs and chroma TBs corresponds directly to the segmentation of the luma PBs and luma TBs in the CU. When the format of video is YUV 4:4:4, the sizes of chroma PBs and TBs match the sizes of corresponding luma PBs and TBs. When the format of video is YUV 4:2:0, chroma PBs and TBs are half the width and half the height of corresponding luma PBs and TBs. If a luma TB has minimum transform size, however, a single chroma TB having that minimum transform size is used.

In some implementations, for an intra BC predicted CU, intra BC prediction for a chroma block in a PU uses the same BV value as intra BC prediction for the luma block in the PU, possibly after scaling and rounding when the chroma data has reduced resolution relative to the luma data (e.g. when the format is YUV 4:2:0 format). Alternatively, different BV values can be signaled for the luma block and chroma blocks of a PU.

In some implementations, if the prediction mode of the luma block of a PU is intra BC prediction, the prediction mode for the chroma blocks of the PU is also intra BC predicted. For example, the prediction mode is signaled for the PU. Alternatively, the prediction mode can be intra BC prediction for the luma block or chroma blocks of the PU, but not both.

B. Constraining BV Search for Intra BC Prediction Mode.

In some example implementations, an encoder limits BV range according to one or more constraints. By limiting BV range, the area of reconstructed sample values that is referenced by fast memory access for intra BC prediction during encoding and decoding can be reduced, which tends to lower implementation cost.

Figure 8:
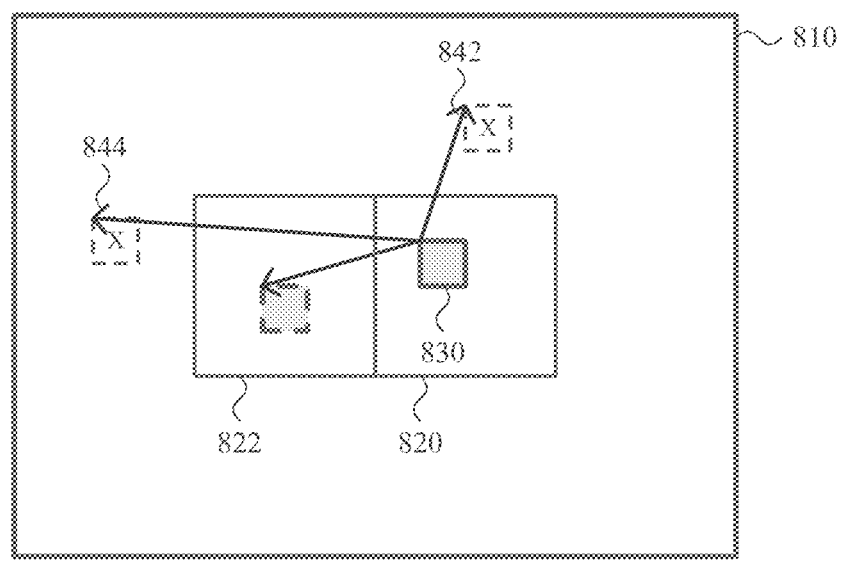
FIG. 8 is a diagram illustrating example constraints on search range for BV values.

FIG. 8 illustrates example constraints on search range for BV values. In addition to a current block (830) of a current frame (810), FIG. 8 shows a search range defined by two CTBs (820, 822). The current CTB (820) is part of the current CTU and includes the current block (830). With the CTB (822) to its left, the current CTB (820) defines a search range within which allowable BVs can be found for the current block (830). BVs (842, 844) reference regions that are outside the search range, so those BV values (842, 844) are not allowed.

In some example implementations, the search range for BV values for a current block is the current CTB and the CTB to its left. For example, a CTB can have size of 64×64, 32×32 or 16×16 sample values, which yields a search range of 128×64, 64×32 or 32×16 sample values. Only sample value in the current CTB and left CTB are used tier intra BC prediction for the current block. This simplifies encoder implementation by constraining the search process. It also simplifies decoder implementation by limiting the number of sample values that the decoder buffers in fast memory for intra prediction. Another constraint is that intra prediction cannot reference sample values from another slice or tile. For a current m×n block with a top left position at $(x_0, y_0)$ and CTB(s) each having dimensions $CTB_{sizeY} \times CTB_{sizeY}$, an encoder can check these constraints for a two-dimensional BV having a horizontal component BV[0] and vertical component BV[1] as follows.

$BV[0] \geq -((x_0 \% CTB_{sizeY}) + CTB_{sizeY})$
$BV[1] \geq -(y_0 \% CTB_{sizeY})$ The sample values at positions $(x_0, y_0)$, $(x_0+BV[0], y_0+BV[1])$ and $(x_0+BV[0]+m-1, y_0+BV[1]+n-1)$ shall be in the same slice.

The sample values at positions $(x_0, y_0)$, $(x_0+BV[0], y_0+BV[1])$ and $(x_0+BV[0]+m-1, y_0+BV[1]+n-1)$ shall be in the same tile.

Figure 9:
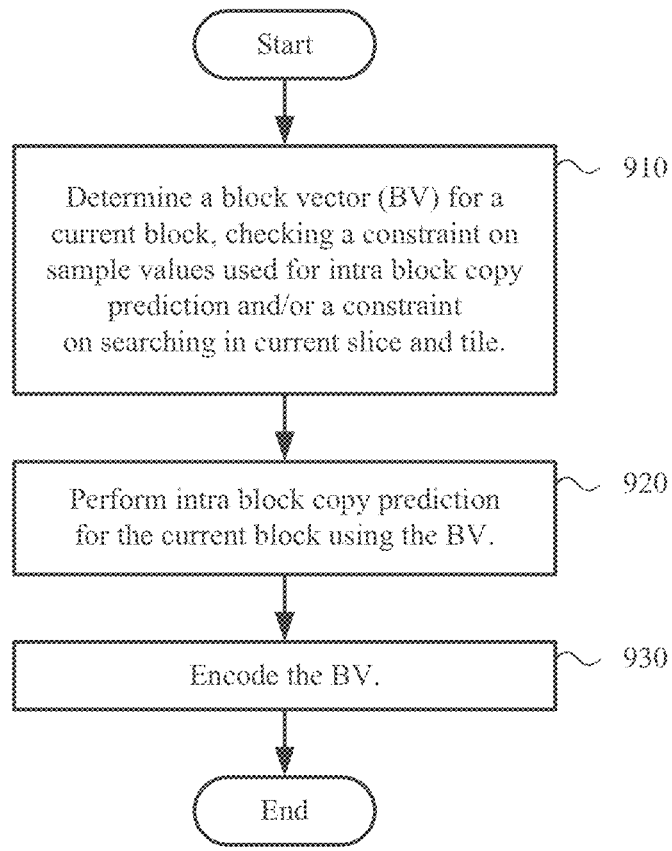
FIG. 9 is a flowchart illustrating a generalized technique for encoding with an intra BC prediction mode, subject to one or more constraints on selection of BV values.

FIG. 9 shows a technique (900) for encoding with an intra BC prediction mode, subject to one or more constraints on selection of 13V values. An encoder such as one described with reference to FIG. 3 or FIGS. 5a-5b can perform the technique (900).

To start, the encoder determines (910) a BV for a current block of a picture. The current block can be a CB, PB or other block. The BV indicates a displacement to a region within the picture. In determining the BV, the encoder checks one or more constraints.

According to one possible constraint, the encoder checks range of sample values used for intra BC prediction. The encoder can check that a candidate intra-prediction region is within a range defined by a current CTB and one or more other CTBs (e.g., CTB to the left of the current CTB). For example, when the BV has a first component BV[0] and a second component BV[1], the current block has a top left position at position $(x_0, y_0)$, and each of the CTB(s) has width $CTB_{width}$ and height $CTB_{height}$, the constraint is satisfied if $BV[0] = -((x_0 \% CTB_{width}) + CTB_{width})$ and $BV[1] \geq -(y_0 \% CTB_{height})$. The encoder can similarly check upper limits on values of BV[0] and BV[1] within the search range: $BV[0] < (CTB_{width} - m - (x0 \% CTB_{width}))$ and $BV[1] < (CTB_{height} - n - (y0 \% CTB_{height}))$. Alternatively, the search range includes more or fewer CTBs, or the search range is defined in some other way.

According to another possible constraint, the encoder limits searching to the current slice and tile (i.e., the current block and region are part of no more than one slice of the picture and no more than one tile of the picture). The encoder can check that a top left position of the current block, a top left position of a candidate intra-prediction region and a bottom right position of the candidate intra-prediction region are part of a single slice and single tile. For example, the constraint is satisfied if $(x_0, y_0)$, $(x_0+BV[0], y_0+BV[1])$ and $(x_0+BV[0]+m-1, y_n+BV[1]+n-1)$ are part of a single slice and single tile.

Alternatively, the encoder checks other and/or additional constraints.

The encoder performs (920) intra BC prediction for the current block using the BV. For example, the encoder performs intra BC prediction for the entire current block. Or, the encoder performs intra BC prediction for multiple blocks associated with the current block (e.g., for multiple TBs on a TB-by-TB basis, where the TBs are associated with a current PB that has the BV).

The encoder encodes (930) the BV. For example, the encoder encodes (930 the BV as described below. The encoder can repeat the technique (900) for another intra BC prediction mode block.

For intra BC prediction, the encoder and decoder use reconstructed sample values. Unreconstructed sample values might be present as parts of a picture that have not been encoded and reconstructed yet. To avoid using unreconstructed sample values for intra BC prediction, the encoder can set constraints on allowable values of BV such that only actual, previously reconstructed sample values are used for intra BC prediction according to a BV.

In some example implementations, the encoder checks a BV value by considering the z-scan orders of the current block and the block that contains the bottom right position of the candidate intra-prediction region. More specifically, the encoder checks that the z-scan order of the block containing the position $(x_0+BV[0]-+1, y_0+BV[1]+n-1)$ is smaller than z-scan order of the block containing $(x_0, y_0)$. If so, the block that contains the bottom right position of the intra-prediction region has been previously reconstructed (and hence so has the rest of the intra-prediction region). The BV also satisfies at least one of the conditions $BV[0]+m \leq 0$ and $BV[1]+n \leq 0$, ensuring that the intra-prediction region does not overlap the current block.

Figure 10:
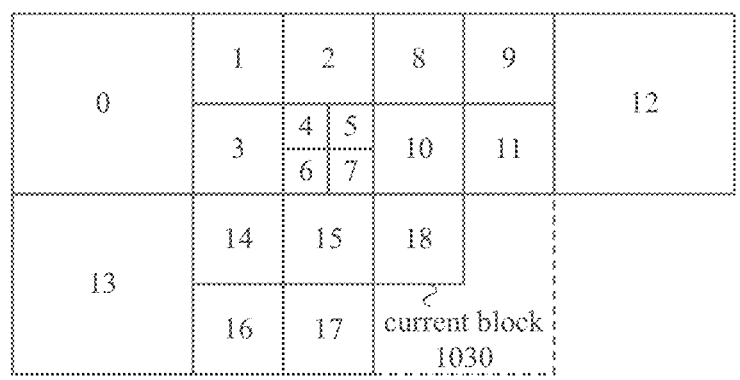
FIG. 10 is a diagram illustrating example z-scan order for blocks of a picture.

The z-scan order follows a sequentially specified ordering of blocks that partition a picture. FIG. 10 shows example z-scan order (1000) for a current block (1030) and blocks that might include the bottom right position of an intra-prediction region for a candidate BV. The current block (1030) can be a CB, PB or other block. The z-scan orders are generally assigned to blocks sequentially from left-to-right in a row, repeating in successive rows from top-to-bottom. When a block is split, z-scan orders are assigned within the split block, recursively. For implementations of encoding/decoding for the HEVC standard, the z-scan order proceeds CTB-to-CTB by a CTB raster scan pattern (left-to-right in a CTB row, repeating in successive CTB rows from top-to-bottom). If a CTB is split, the z-scan order follows a raster scan pattern for CBs of a quadtree within the split CTB. And, if a CB is split (e.g., into multiple CBs, or into multiple PBs), the z-scan order follows a raster scan pattern for blocks within the split CB.

Figure 11A:
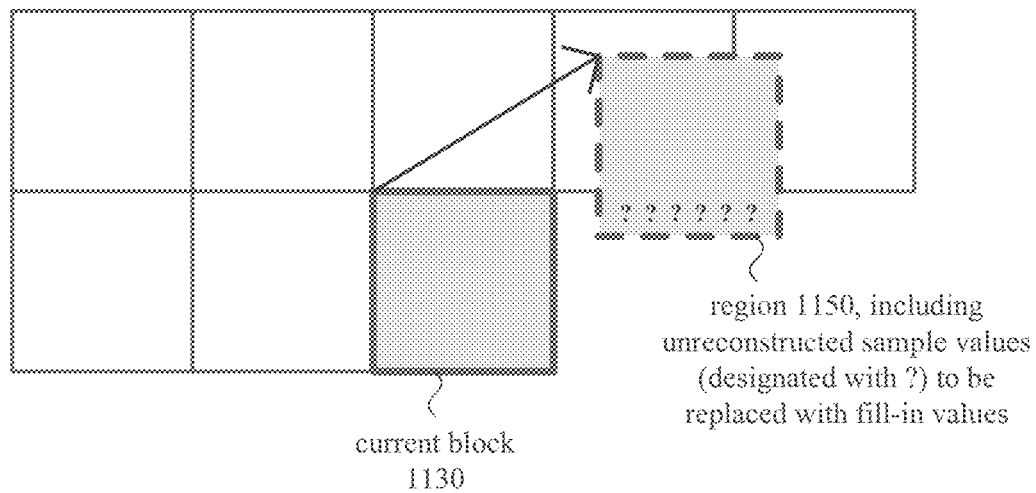
FIGS. 11a and 11b are diagrams illustrating regions with unreconstructed sample values to be replaced by fill-in values.
Figure 11B:
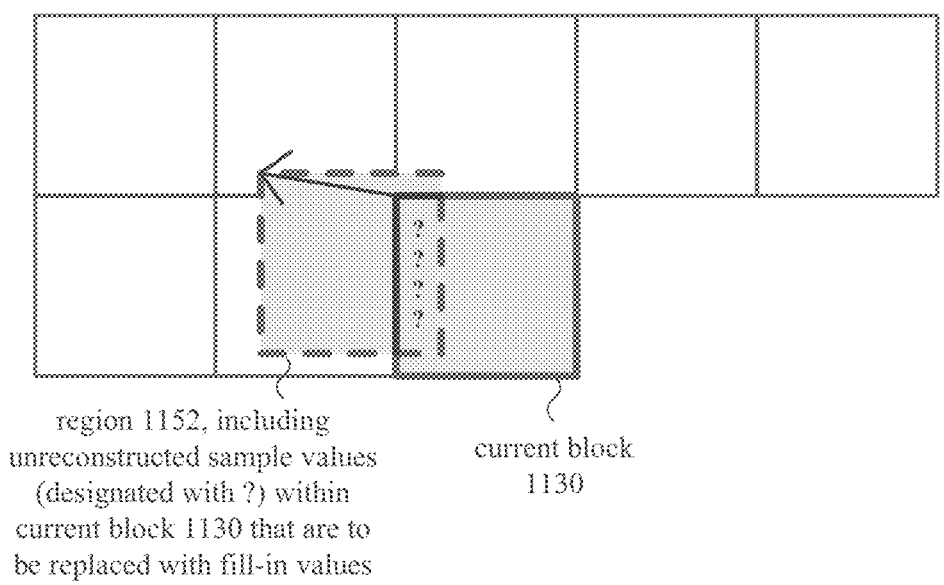

Alternatively, to avoid using unreconstructed sample values for intra BC prediction the encoder (and decoder) can replace the unreconstructed sample values with default or otherwise determined values. FIGS. 11a and 11b show examples of intra-prediction regions with unreconstructed sample values to be replaced by fill-in values. In FIG. 11a, an intra-prediction region (1150) for the current block (1130) includes some sample values in a previously reconstructed row of blocks, but also includes unreconstructed sample values below that row. In FIG. 11b, an intra-prediction region (1152) includes some sample values in previously reconstructed blocks above the current block (1130) and to the left of the current block (1130) but also includes some unreconstructed sample values in the current block (1130). The encoder (and decoder) can till unreconstructed sample values with a predefined value. For example, the predefined value is 128 (gray) for sample values that have a bit depth of 8. Or, the predefined value is another value. Or, instead of filling with a predefined value, unreconstructed sample values can be filled by horizontal or vertical expanding or interpolation, or by some other form of expanding or interpolation such as angular directional expanding, planar surface fitting expanding, or expanding using the average value of some available reconstructed sample values. In such a case, the encoder can still check constraints such that sample values not in the search range are not used for intra BC prediction. The encoder may also provide syntax information within the coded bitstream data to control the process of filling the unreconstructed sample values—such as by sending a constant value to be used, by sending an indicator of a prediction angle for angular directional expanding, or by sending an indicator to select between multiple methods of expanding.

During encoding, an encoder can fill unreconstructed sample values of an intra-prediction region with padded sample values (e.g., based upon interpolation within or extrapolation from actual reconstructed sample values) or fill-in sample values having a predefined value (e.g., gray value) as part of the intra BC prediction process. During decoding, in the same way, a decoder can fill unreconstructed sample values of an intra-prediction region with padded sample values or fill-in sample values having a predefined value as part of the intra BC prediction process.

Alternatively, when intra BC prediction can be performed on a TB-by-TB basis (see section G), the encoder and decoder can check for possible overlap between an intra-prediction region and a current block (TB), then use the results of the check to decide whether the current TB should be split into smaller TBs for application of intra BC prediction operations. Suppose a current TB has a size of m×n, where in and n can be equal to each other or can have different values. If BV[0]>−m and BV[1]>−n, the intra-prediction region overlaps the current m×n TB, which is problematic unless the current m×n TB is split into smaller TBs for application of intra BC prediction operations. Thus, if BV[0]>−m and BV[1]>−n, the encoder and decoder split the current TB into smaller TBs. The same condition is checked (e.g., checked recursively) for the smaller TBs, which may be further split if BV[0]≥−m and BV[1]>−n even for the smaller values of m and n aver splitting.

For example, suppose the BV for a PB is (−9, −5), and the current TB is a 32×32 block. The encoder and decoder determine that −9>−32 and −5>−32, indicating that the intra-prediction region (whose top left corner is displaced −9, −5) would overlap the current 32×32 TB. The encoder and decoder split the 32×32 TB into tour 16×16 TBs. For each of the 16×16 TBs, the encoder and decoder determine that −9>−16 and −5>−16, indicating that the intra-prediction region (whose top left corner is displaced −9, −5) would overlap the current 16×16 TB. The encoder and decoder split each 16×16 TB, in succession, into four 8×8 TBs. For an 8×8 TB, the BV of (−9, −5) is not problematic, so the 8×8 TB is not forced to be further split.

In this scenario, when a TB is split due to a BV value and size of the TB, the encoder can skip signaling of the flag value that would otherwise signal whether to split the current TB into smaller TBs. The bitstream of encoded data lacks the flag value directing the decoder to split the current TB into smaller TBs. Instead, the decoder can infer that a TB should be split due to a BV value and the size of the TB. This can save bits that would otherwise be spent signaling information about splitting TBs.

C. Intra BC Prediction Mode if Constrained Intra Prediction is Enabled.

In some example implementations, how intra BC prediction is performed depends on whether constrained intra prediction is enabled. Constrained intra prediction is a setting used to control resilience to errors that may be introduced into encoded video data (e.g., due to packet losses or bit flips from interference). Constrained intra prediction limits which reconstructed sample values can be used for intra prediction. When constrained intra prediction is enabled, reconstructed sample values from inter-coded blocks cannot be used for intra BC prediction or intra spatial prediction. A flag in the bitstream can indicate whether constrained intra prediction is enabled.

FIG. 12 shows a technique (1200) for using intra BC prediction mode when constrained intra prediction can be enabled. An encoder such as one described with reference to FIG. 3 or FIGS. 5a-5b can perform the technique (1200). Or, a decoder such as one described with reference to FIG. 4 or FIG. 6 can perform the technique (1200).

The encoder or decoder determines (1210) whether constrained intra prediction is enabled. For example, the encoder or decoder checks the value of a flag that controls whether constrained intra prediction is enabled. The flag can be signaled as part of a picture parameter set or at some other level.

The encoder or decoder (1220) performs intra BC prediction for a current block, depending at least in part on whether constrained intra prediction is enabled. There are several approaches to adjusting intra BC prediction depending on whether constrained intra prediction is enabled, as detailed below. The encoder or decoder can repeat the technique (1200) for another intra BC prediction mode block.

In one approach, when an encoder determines a BV for the current block, if constrained intra prediction is enabled, the encoder checks that no sample value of the candidate intra-prediction region is a reconstructed sample value from an inter-coded block. If constrained intra prediction is not enabled, the constraint does not apply, and intra BC prediction can use reconstructed sample values from an inter-coded block.

FIG. 13 illustrates this constraint on allowable BV values when constrained intra prediction is enabled. BVs (1342, 1344) for intra-prediction regions in intra-coded blocks are allowed, whether the blocks were encoded using intra spatial prediction or infra BC prediction. BVs (1346, 1348) for intra-prediction regions that are entirely or partially in an inter-coded block are not allowed. For example, if constrained intra prediction is enabled, when determining a BV for a current block, the encoder checks that any sample value p[x][y] of the candidate intra-prediction region is within an intra-coded block. That is, for a current m×n block with a top left position at position $(x_0, y_0)$, the encoder checks this condition for all p[x][y] with x=$x_0$+BV[0] ... x0+BV[0]+m−1 and y=$y_0$+BV[1] ... $y_0$+BV[1]+n−1.

Another approach uses fill-in sample values in place of reconstructed sample values of an inter-coded block if constrained intra prediction is enabled. If constrained intra prediction is enabled, intra BC prediction includes determining a fill-in sample value or padded sample value (by extrapolation or interpolation) in place of any sample value of the intra-prediction region that is a reconstructed sample value from an inter-coded block.

In still another approach, if constrained intra prediction is enabled, intra BC prediction is disabled in non-intra slices. Intra BC prediction is still allowed for intra slices (which have only intra-coded content) and for non-intra slices when constrained intra prediction is not enabled. FIG. 14 illustrates this approach. In FIG. 14, a condition in a syntax table (1400) indicates presence or absence of intra_bc_flag syntax elements used for infra BC prediction. Even if intra BC prediction is enabled (intra_block_copy_enabled_flag is 1), an intra BC flag is signaled only if the current slice is an intra slice (slice_type is 1) or constrained intra prediction is not enabled (constrained_intra_pred_flag is 0).

D. Encoding and Decoding of BV Values.

In some example implementations, two-dimensional BV values are encoded efficiently by exploiting probabilities of occurrence of values for a first component given a value for a second component.

Figure 15A:
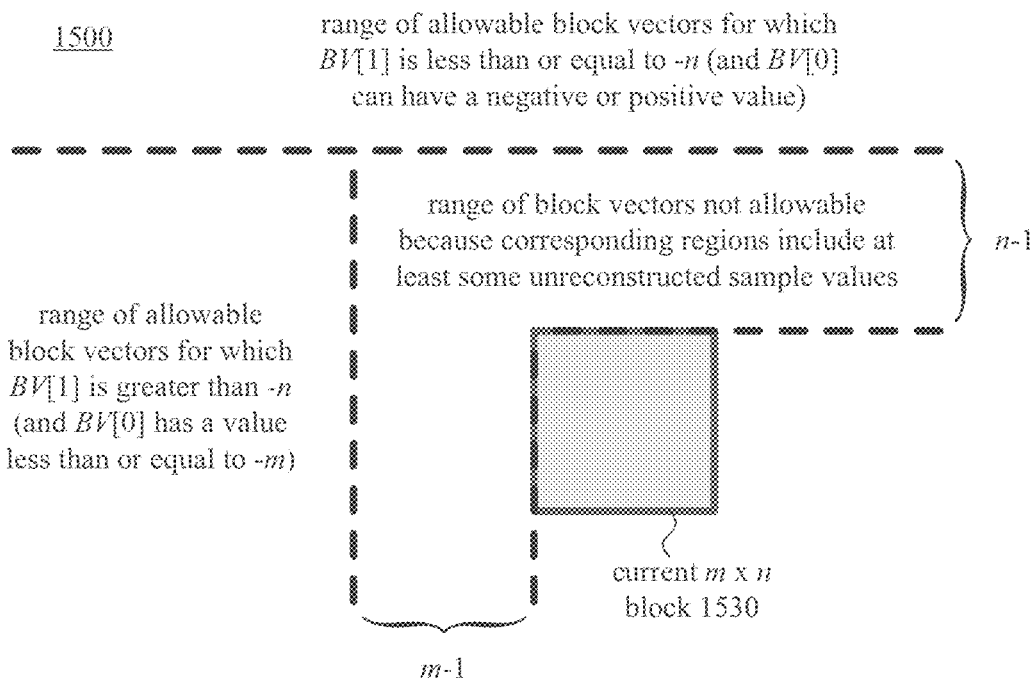
FIGS. 15a and 15b are diagrams illustrating example ranges of BV values having properties that can be exploited in encoding.
Figure 15B:
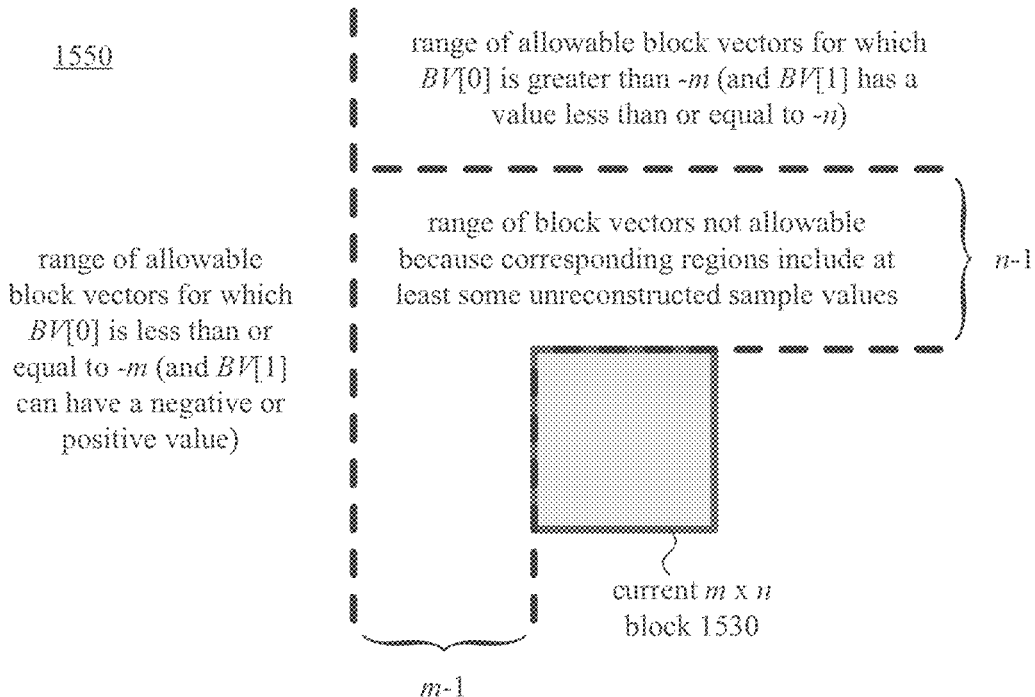

FIGS. 15a and 15b show example ranges of BV values having properties that can be exploited in encoding. In FIGS. 15a and 15b, a BV is found for a current m×n block (1530). The BV has a horizontal component BV[0] and a vertical component BV[1]. Intra BC prediction is constrained to only use actual reconstructed sample values. (Alternatives in which other BV values, referencing unreconstructed sample values, are allowed are addressed at the end of this section.)

Because intra BC prediction only uses actual reconstructed sample values, BV values in the range where BV[0]>−m and BV[1]>−n are not allowable. In this range, candidate intra-prediction regions will have at least some unreconstructed sample values.

As shown in FIG. 15a, when BV[1]<−n, BV[0] can have a positive or negative value. When BV[1]>−n, however, the allowable BVs have BV[0]≤−m (assuming intra BC prediction is constrained to only use actual reconstructed sample values). The horizontal component of the BV can be adjusted by an outset value. This improves coding efficiency in typical entropy coding schemes because values closer to zero are encoded using fewer bits. For example, instead of directly coding BV[0], the horizontal component is coded as DV[0]=BV[0]+m. The DV[0] value is closer to 0 than BV[0], and typically is encoded using fewer bits. When DV[0] is decoded from the bitstream, BV[0] can be reconstructed as DV[0]−m. Specifically, the BV is reconstructed as follows. First, BV[1] is decoded. If BV[1]>−n, then BV[0]=DV[0]−m. Otherwise (when BV[1]≤−n), BV[0]= DV[0].

Similarly, as shown in FIG. 15b, when BV[0]≤−m, BV[1] can have a positive or negative value. When BV[0]>−m, however, the allowable BVs have BV[1]≤−n (assuming intra BC prediction is constrained to only use actual reconstructed sample values). The vertical component of the BV can be adjusted by an offset value, for example, as DV[1]=BV[1]+n. When DV[1] is decoded from bitstream, BV[1] can be reconstructed as DV[1]−n.

Alternatively, instead of being based on a dimension m or n of the current block, the offset value can be set in the bitstream (e.g., in a sequence parameter set, picture parameter set or slice header) or given a predefined value. For example, the offset value can be set to 8, 16 or some other value. Adjusted BV component values will still be closer to zero than they would otherwise be, in most cases.

FIG. 16 shows a technique (1600) for encoding BV values. An encoder such as one described with reference to FIG. 3 or FIGS. 5a-5h can perform the technique (1600).

The encoder determines (1610) a two-dimensional BV for a current block of a picture. The BV has a first component and a second component. For example, the encoder searches for the BV in a search range subject to one or more constraints, as described above. The encoder performs (1620) intra BC prediction for the current block using the BV. For example, the encoder performs intra BC prediction for the entire current block. Or, the encoder performs intra BC prediction for multiple blocks associated with the current block (e.g., for multiple TBs on a TB-by-TB basis, where the TBs are associated with a current PB that has the BV).

The encoder encodes (1630) the BV. The encoding of the BV exploits probabilities of occurrence of values for the first component given a value for the second component. In some implementations, the encoding of a value for the first BV component depends on the value for the second BV component. The encoder can compare the value for the second component to a first offset value, then selectively adjust the value for the first component using a second offset value. For example, the first component is a horizontal component BV[0], the second component is a vertical component BV[1], and the current block is an m×n block. The first offset value depends on n and the second offset value depends on m. If the value for the vertical component BV[1] is greater than −n, the value for the horizontal component BV[0] is increased by m. After this adjustment, the encoding of the BV can include binary arithmetic coding or another form of entropy coding.

The encoder can repeat the technique (1600) for another intra BC prediction mode block.

FIG. 17 shows a technique (1700) for decoding BV values. A decoder such as one described with reference to FIG. 4 or FIG. 6 can perform the technique (1700).

The decoder decodes (1710) a two-dimensional BV for a current block of a picture. The BV has a first component and a second component. The decoder reverses encoding of the BV that exploits probabilities of occurrence of values for the first component given a value for the second component.

The decoding of the BV can include binary arithmetic decoding or another form of entropy decoding.

After the binary arithmetic decoding or other entropy decoding, the value for the first BV component is adjusted. In some implementations, the decoding of a value for the first BV component depends on the value for the second BV component. The decoder can compare the value for the second component to a first offset value, then selectively adjust the value for the first component using a second offset value. For example, the first component is a horizontal component BV[0], the second component is a vertical component BV[1], and the current block is an m×n block. The first offset value depends on n and the second offset value depends on m. If the value for the vertical component BV[1] is greater than −n, the value for the horizontal component BV[0] is reduced by m.

The decoder performs (1720) intra BC prediction for the current block using the BV. For example, the decoder performs intra BC prediction for the entire current block. Or, the decoder performs intra BC prediction for multiple blocks associated with the current block (e.g., for multiple TBs on a TB-by-TB basis, where the TBs are associated with a current PB that has the BV). The decoder can repeat the technique (1700) for another intra BC prediction mode block.

Alternatively, for the techniques (1600, 1700) illustrated in FIGS. 16 and 17, the first component is a vertical component BV[1], the second component is a horizontal component BV[0], the first offset value depends on m and the second offset value depends on n. If the value for the horizontal component BV[0] is greater than −m, the value for the vertical component BV[1] is increased by n (during encoding) or reduced by n (during decoding).

Or, for the techniques (1600, 1700) illustrated in FIGS. 16 and 17, the first component and the second component can be jointly coded in a way that exploits absence of codes for at least some combinations of the first component and the second component. For example, the encoder and decoder use a variable length code table with codes absent for combinations of the first component and the second component that are in the range bordering the current block.

If BV values that reference intra-prediction regions with unreconstructed sample values are allowed, the encoder and decoder can still adjust a BV component value. For example, the encoder adjusts the value for one of the BV components to bring it closer to zero, on average, considering the value of the other BV component. The adjusted value of BV component may have a positive value, but it is more likely to be closer to zero and hence encoded using fewer bits.

In example implementations, intra BC prediction uses integer values for BV. Fractional displacements (and fractional interpolation between reconstructed sample values) are not used. Alternatively, BVs can have fractional displacements.

Alternatively, when search range is constrained, the encoding and decoding of BV values can use modulo wrapping. If the component of a BV value indicates a position outside of the search range, the component "wraps around" to the opposite side of the search range and continues from there. This can make it more efficient to encode extreme values of displacements. For example, if a positive displacement greater than x would result in a BV[0] value that points outside the search range, a displacement of x for BV[0] could be used to indicate an extreme negative value at the opposite side of the search range.

Aside from entropy coding/decoding of BV values that includes use of offset values (as described above), an encoder and decoder can use BV prediction and/or merge node/BV competition when encoding/decoding BV values.

For basic BV prediction during encoding and decoding, the BV value for a current block can be predicted based on the BV values of one or more previous blocks. The BV value of a neighboring block (e.g., block left of the current block) can be used to determine a BV predictor for the BV value of the current block. Or, the BV predictor for the BV value of the current block can be the component-wise median or average of the BV values of multiple neighboring blocks (e.g., blocks to the left, above and above-left of the current block). During encoding, a BV difference is determined using the BV value and BV predictor, and the BV difference is encoded. During decoding, the reconstructed BV difference is combined with the BV predictor.

Or, an encoder and decoder determine one or more candidate BV values for a current block among the BV values used for reconstructed blocks that spatially neighbor the current block (e.g., block to the left of the current block, block above the current block, and so on). The candidate BV value(s) can also include one or more BV values used for reconstructed blocks that temporally neighbor the current block, where a temporally neighboring block is at a corresponding position as the current block in another picture (e.g., same position or overlapping position). The list of candidate BV value(s) is determined by rules during encoding and decoding to eliminate redundant BV values. During encoding, the encoder can signal one or more syntax elements indicating which of the candidate BV value(s) to use as the BV predictor for the current block. In some modes, that BV predictor can be used as the BV value for the current block, which effectively "merges" the BV value of the current block with the BV value the neighbor providing the candidate BV value. Or, the encoder can determine and encode a BV difference based on the BV value and BV predictor. When a BV difference is signaled, the selection of the BV predictor can happen automatically (without signaling of syntax elements to select a candidate BV value). During decoding, the decoder can receive one or more syntax elements indicating which of the candidate BV value(s) to use as the BV predictor for the current block. In some modes, that BV predictor can be used as the BV value for the current block, which effectively "merges" the BV value of the current block with the BV value the neighbor providing the candidate BV value. Or, the decoder can receive and decode a BV difference, which the decoder combines with the BV predictor to reconstruct the BV value. When a BV difference is signaled, the selection of the BV predictor can happen automatically (without signaling of syntax elements to select a candidate BV value). A BV "skip" or BV "direct" mode can be provided in which the BV predictor (selected by rule) is used as the BV value of the current block, with no residual values signaled tier the current block.

E. Forward and Inverse Transforms for Intra BC Prediction Mode Blocks.

When intra BC prediction is used, in some example implementations, certain sizes of luma residual blocks are encoded using a discrete sine transform ("DST"), or integer approximation thereof, and decoded using an inverse DST, or integer approximation thereof. In particular, DST (or integer approximation thereof) and inverse DST (or integer approximation thereof) are used for 4×4 luma blocks of residual values from intra BC prediction. More generally, when intra BC prediction is used, the encoder uses a first type of forward transform ("regular" transform) for some sizes of luma blocks of residual values from intra BC prediction and for chroma blocks, and the decoder uses a first type of inverse transform ("regular inverse transform) for such blocks. For other sizes of luma blocks of residual values, however, the encoder uses a second type of forward transform ("alternative" transform), and the decoder uses a second type of inverse transform ("alternative" inverse transform).

Figure 18:
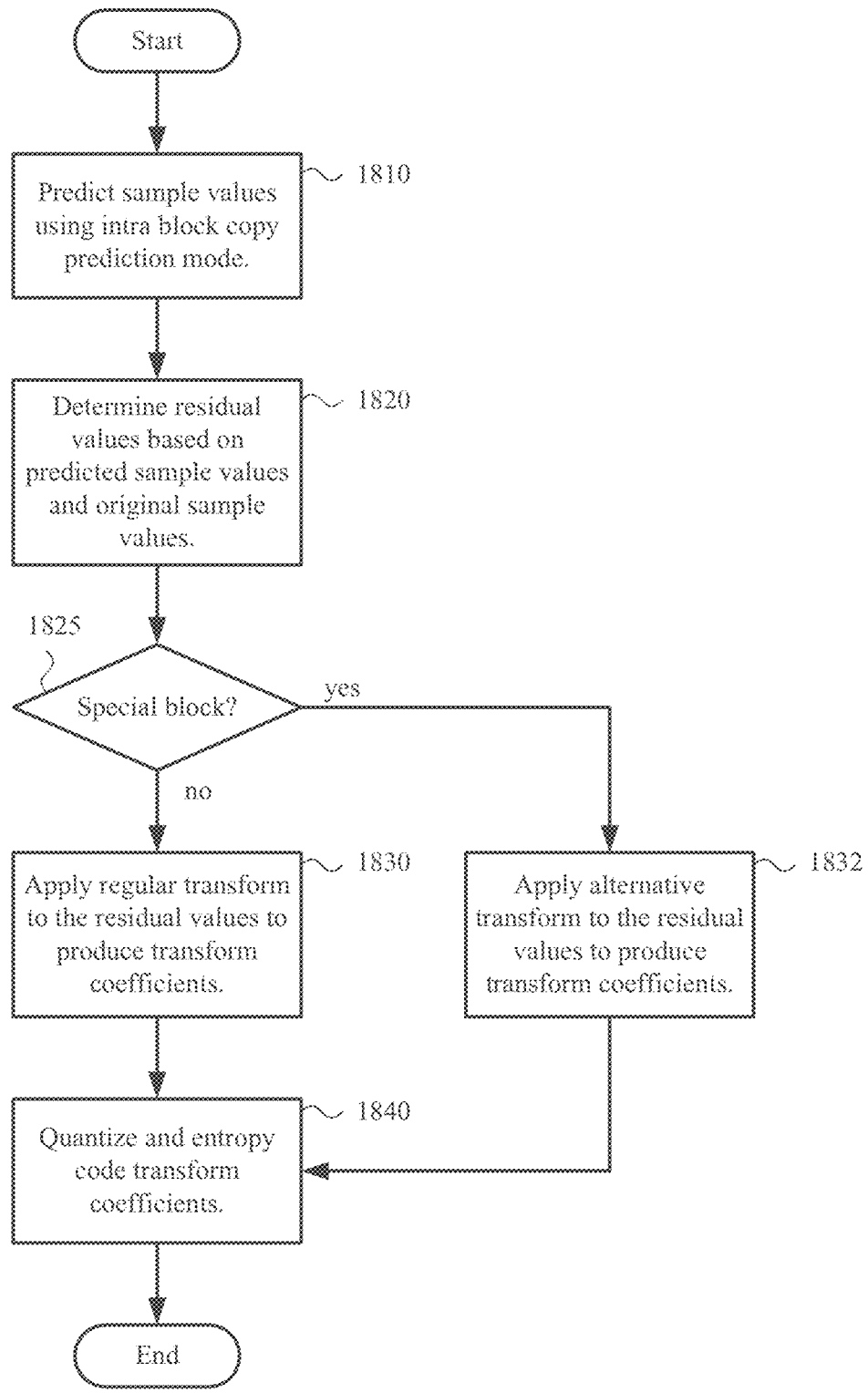
FIGS. 18 and 19 are flowcharts illustrating generalized techniques for encoding and decoding, respectively, using an intra BC prediction mode and alternative forward (or inverse) frequency transforms.

FIG. 18 shows a generalized technique (1800) for encoding using an intra BC prediction mode and alternative transforms. An encoder such as one described with reference to FIG. 3 or FIGS. 5a-5b can perform the technique (1800).

The encoder predicts (1810) sample values using intra BC prediction mode, then determines (1820) residual values based on the predicted sample values and original sample values.

The encoder checks (1825) whether special blocks (e.g., luma blocks with a special size) are being encoded. If so, the encoder applies (1832) an alternative forward transform to the residual values to produce transform coefficients, which are quantized and entropy coded (1840). For example, the encoder applies a DST, integer approximation thereof or other type of forward transform to 4×4 luma blocks of residual values front intra BC prediction. Otherwise, the encoder applies (1830) a regular forward transform to the residual values to produce transform coefficients, which are quantized and entropy coded (1840). For example, the encoder applies a DCT, integer approximation thereof or other type of forward transform to other sizes of blocks of residual values from intra BC prediction and to chroma blocks. The encoder can repeat the technique (1800) for another intra BC prediction mode block.

Figure 19:
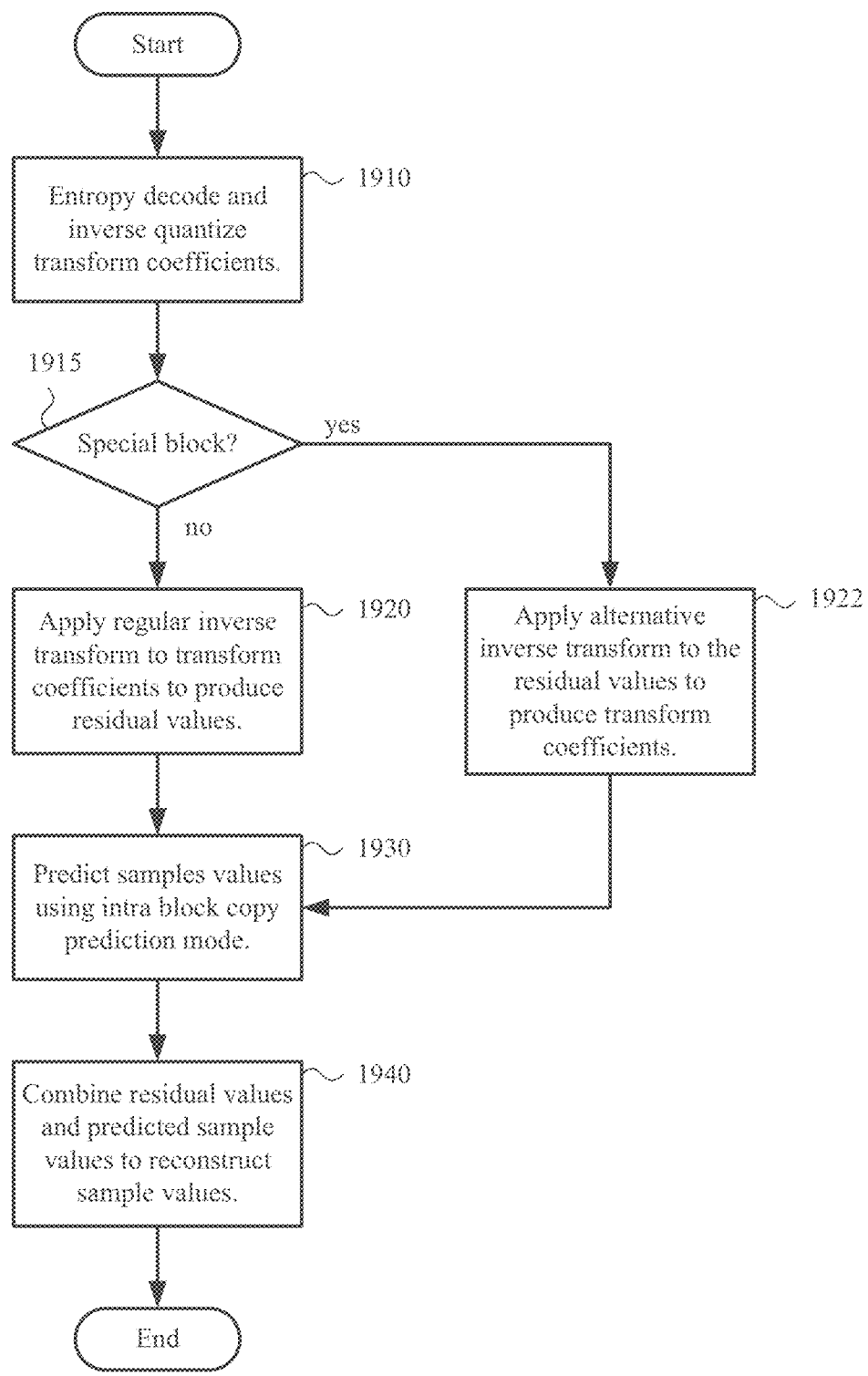

FIG. 19 shows a generalized technique (1900) for decoding using an intra BC prediction mode and alternative inverse transforms. A decoder such as one described with reference to FIG. 4 or FIG. 6 can perform the technique (1900).

The decoder entropy decodes and inverse quantizes (1910) transform coefficients. The decoder checks (1915) whether special blocks (e.g., luma blocks with a special size) are being decoded. If so, the decoder applies (1922) an alternative inverse transform to the transform coefficients to produce residual values. For example, the decoder applies an inverse DST, integer approximation thereof or other type of inverse transform to transform coefficients for 4×4 luma blocks of residual values from intra BC prediction. Otherwise, the decoder applies (1920) a regular inverse transform to transform coefficients. For example, the encoder applies an inverse DCT, integer approximation thereof or other type of inverse transform to other sizes of blocks from intra BC prediction and to chroma blocks. The decoder predicts (1930) sample values using intra BC prediction mode. The decoder combines (1940) the residual values and the predicted sample values to reconstruct sample values. The decoder can repeat the technique (1900) for another intra BC prediction mode block.

F. In-Loop Deblock Foiling for Intra BC Prediction Mode Blocks.

In some example implementations, deblock filtering across a boundary between blocks depends on prediction mode of the blocks (e.g., intra spatial prediction, infra BC prediction or inter prediction). Also, in some example implementations, deblock filtering across a boundary between intra BC prediction blocks adapts depending on BV values.

In general, a deblocking filter is selectively applied to sample values adjacent a block boundary for a block (e.g., PB, TB). Special rules may apply to disable or alter filtering at a picture boundary, slice boundary or tile boundary. The encoder or decoder sets a strength for the deblock filtering depending on various factors, including prediction mode (intra spatial, intra BC prediction, inter), reference index values and motion vector values (for inter-coded blocks), BV values (for intra BC predicted blocks) and presence/absence of non zero transform coefficients.

For example, suppose blocks P and Q are adjacent blocks with a common boundary. If one or both of the blocks P and Q has prediction mode of intra spatial prediction, the filtering strength has a first value (e.g., indicating strongest filtering). On the other hand, if the blocks P and Q are both inter-coded, both intra BC predicted, or one inter-coded and one intra BC predicted, then the filtering strength has another value (e.g., indicating moderate filtering or indicating no filtering.

If both of blocks P and Q are inter-coded, the filtering strength value that indicates moderate filtering is assigned if: (a) either block has any non-zero transform coefficients, (b) reference index values for the two blocks are not equal, (c) motion vector values for the two blocks are not equal, or (d) the difference between the two motion vector components for either block is greater than a threshold amount (e.g., one sample). Otherwise (no condition satisfied), the filtering strength value that indicates no filtering is assigned.

If both of blocks P and Q are intra BC predicted, the filtering strength value that indicates moderate filtering is assigned if: (a) either block has any non-zero transform coefficients, (b) BV values for the two blocks are not equal, or (c) the difference between BV components fir either block is greater than a threshold amount (e.g., one sample). Otherwise (no condition satisfied), the filtering strength value that indicates no filtering is assigned.

If one of blocks P and Q is inter-coded and the other is infra BC predicted, the filtering strength value that indicates moderate filtering is assigned if (a) either block has any non-zero transform coefficients. Otherwise, the filtering strength value that indicates no filtering is assigned. Alternatively, if one of blocks P and Q is inter-coded and the other is intra BC predicted, the filtering strength can have the first value (e.g., indicating strongest filtering).

For strong and moderate filtering, the filtering can be further adjusted depending on quantization parameter values or other considerations. Alternatively, filtering strength is assigned and/or adjusted according to other rules.

Figure 20:
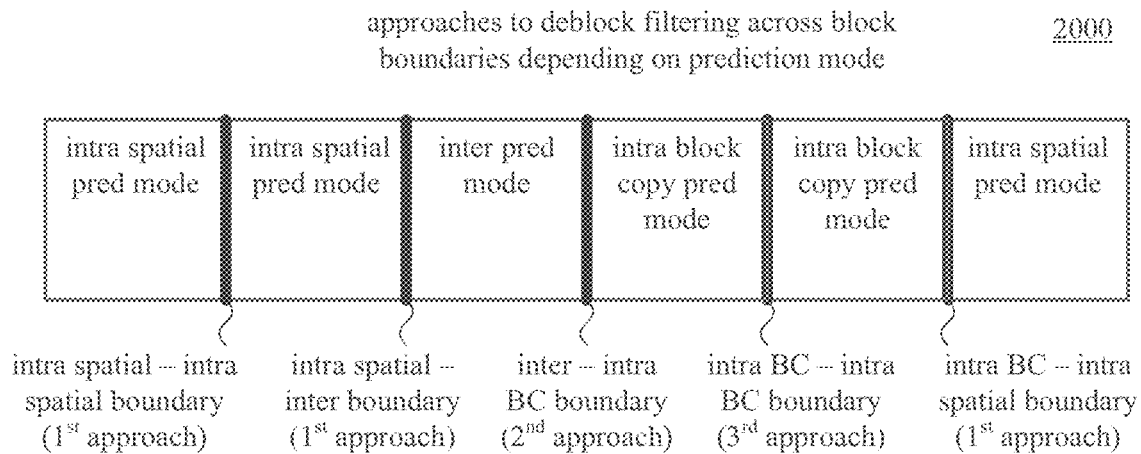
FIG. 20 is a diagram illustrating example rules for changing an approach to in-loop deblock filtering depending on prediction modes of blocks.

FIG. 20 shows example rules (2000) for changing an approach to in-loop deblock filtering depending on prediction modes of blocks. If either of two adjacent blocks has prediction mode of intra spatial prediction, for the boundary between the blocks, the encoder or decoder applies a first approach to deblock filtering (e.g., strong filtering). Otherwise, if prediction mode for one of the two blocks is inter prediction and prediction mode for the other is intra BC prediction, the encoder or decoder applies a second approach to deblock filtering (e.g., moderate filtering or no filtering depending on presence/absence of non-zero transform coefficient levels). Otherwise, if prediction mode for both of the two blocks is intra BC prediction, the encoder or decoder applies a third approach to deblock filtering (e.g., moderate filtering or no filtering depending on presence/absence of non-zero transform coefficient levels and depending on BV values). Otherwise (prediction mode for both blocks is inter prediction; not shown in FIG. 20), the encoder or decoder applies a fourth approach to deblock filtering (e.g., moderate filtering or no filtering depending on presence/absence of non-zero transform coefficient levels, reference index values and motion vector values). For all approaches, the filtering can be further adjusted depending on quantization parameter values or other considerations.

Figure 21:
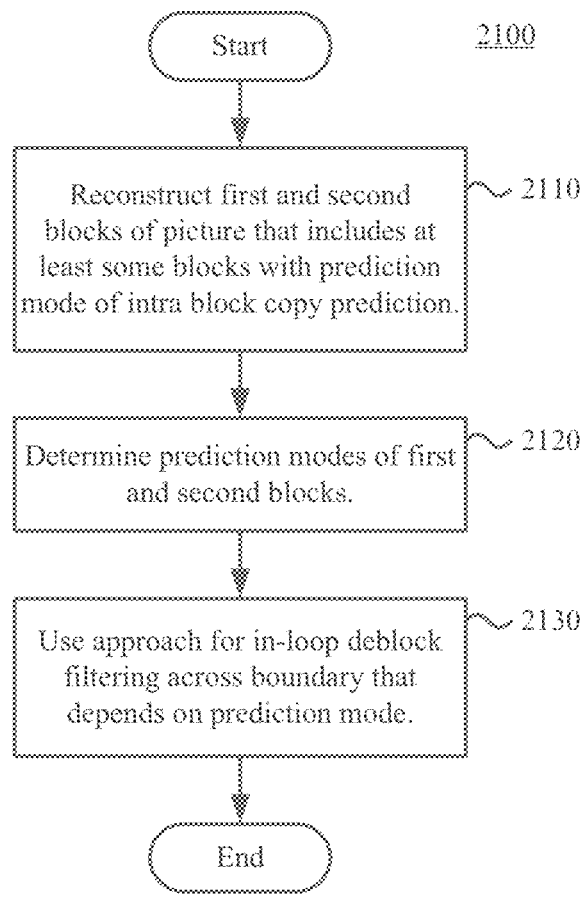
FIG. 21 is a flowchart illustrating a generalized technique for in-loop deblock filtering during encoding or decoding for blocks having intra BC prediction mode.

FIG. 21 shows a technique (2100) for in-loop deblock filtering for a block having intra BC prediction mode. An encoder such as one described with reference to FIG. 3 or FIGS. 5a-5b can perform the technique (2100). Or, a decoder such as one described with reference to FIG. 4 or FIG. 6 can perform the technique (2100).

The encoder or decoder reconstructs (2110) first and second blocks of a picture, which includes at least some blocks with prediction mode of intra BC prediction.

The encoder or decoder performs in-loop deblock filtering across a boundary between the first and second blocks. As part of the in-loop deblock filtering, the encoder or decoder determines (2120) prediction mode for each of the first and second blocks and uses (2130) an approach to deblock filtering that depends at least in part on prediction mode. In particular, if the prediction mode for both of the first and second blocks is intra BC prediction, the encoder or decoder adjusts the in-loop deblock filtering based at least in part on values of BVs for the first and second blocks, respectively.

The encoder or decoder can repeat the technique (2100) for other block boundaries in the picture.

With regard to the timing of deblock filtering (and other in-loop operations such as SAO filtering) relative to intra BC prediction, in some implementations intra BC prediction operations precede any deblock filtering and SAO filtering operations to be applied for previous parts of a picture. For example, the intra BC prediction operations can use stored copies of sample values before application of the filtering processes. This eliminates the need to synchronize filtering processes with intra BC prediction processes. It also prevents indirect dependencies on sample values outside of a slice, tile, etc. (or within an inter-coded block, when constrained intra prediction is enabled) when filtering uses such sample values.

Alternatively, intra BC prediction operations follow any deblock filtering and SAO filtering operations to be applied for previous parts of a picture. This can require synchronization of filtering and prediction operations, and can create dependencies on sample values in another slice, tile, etc. On the other hand, using filtered sample values fir intra BC prediction may provide for efficient compression in terms of rate-distortion performance.

G. Example Implementation Combining Features of Intra BC Prediction.

As noted, the preceding features of intra BC prediction can be used separately and individually. Or, the preceding features of intra BC prediction can be used can be used in combination.

For example, in one combined implementation that generally follows HEVC syntax, a BV value is signaled fora PU (which can be a CU, or part of a CU). The PU can include one or more TUs. Infra BC prediction processes operate at the level of TBs, on a TB-by-TB basis, using the BV value signaled for the PU. (All TBs use the same BV value, and intra BC prediction for a current TB can use reconstructed sample values of other, earlier TBs in the same CU). The BV value can be predicted using the BV values of one or more neighboring PUs. Whether or not BV prediction is used, the BV value (or BV difference value) can be encoded in a manner that accounts for allowable BV values (e.g., by taking account of horizontal/vertical allowed values or by using modulo wrapping when encoding the BV value). The selection of BV values is constrained: (a) such that the encoder is prohibited from selecting BV values that would cause any sample values to be referenced that lie within areas that have not yet been encoded/reconstructed (i.e., the sample values of an intra-prediction region for a current TB must be in areas covered by other TBs that precede the current TB in decoding/bitstream order; that is, for a given TB, the BV value is constrained to reference a region that is outside of the TB); (b) to reduce the necessary memory capacity in the decoder (e.g., by constraining references according to BV values to be within the current CTB and one or two CTBs to the left of the current CTB); (c) to prohibit references according to BV values from being outside the current slice, outside the current tile or outside the picture; and (d) when constrained intra prediction is enabled, to prohibit the encoder from using BV values that would reference sample values that used inter-picture prediction.

VIII. Encoder-Side Options for Infra Block Copy Prediction Mode.

This section presents various innovations for encoder-side options for intra block copy ("BC") prediction. Some of the innovations relate to concurrently performing block vector ("BV") estimation and making block splitting decisions for a block. Other innovations relate to selectively merging blocks into a larger block during BV estimation. In general, these innovations improve coding efficiency of intra BC prediction.

As part of BV estimation, the encoder can use any of several approaches. The encoder can use a bill search, evaluating every candidate BV value allowed in a search range. Or, the encoder can use a partial search, evaluating only some of the candidate BV values allowed in a search range. For example, the encoder can start a partial search at the predicted BV value for a current block (e.g., predicted based on BV values of one or more neighboring blocks). After evaluating the candidate BV value at the starting position for the partial search, the encoder can evaluate one or more other candidate BV values at increasing distances from the starting position (e.g., according to a spiral search pattern or some other pattern). When evaluating a given candidate BV value, the encoder can compare all sample values in the intra-prediction region and current block. Or, the encoder can evaluate a subset of the sample values (that is, sub-sample which values are evaluated). When comparing sample values between the intra-prediction region and current block to determine a distortion cost, the encoder can compute mean square error, sum of squared differences, or some other measure of distortion. The encoder can also determine a rate cost associated with encoding of the candidate BV value.

During encoding, at various stages, an encoder can use rate-distortion optimization ("RDO") in which the rate cost and distortion cost of various options are evaluated. In general, rate-distortion cost for an option is given by $D+\lambda R$ (or $R+\lambda D$), where R represents the rate cost in terms of bits of encoded data, D represents the distortion cost using a metric such as mean squared error or a perceptual distortion measure, and $\lambda$ is a Lagrangian multiplier (example of weighting parameter) that weights the rate cost R compared to the distortion cost D. The encoder typically selects the option that gives the lowest rate-distortion cost.

A. Selectively Merging Blocks into Larger Block During BV Estimation.

During BV estimation, an encoder can merge blocks into a larger block. In this way, the encoder can reduce the number of bits used to signal BV information. In particular, when intra BC prediction is performed on a TB-by-TB basis, the encoder can perform BV estimation on a CB-by-CB basis then merge small CBs into a larger CB, relying on splitting of the CB into smaller TBs during intra BC prediction to avoid overlap between a TB and its intra-prediction region.

Figure 22:
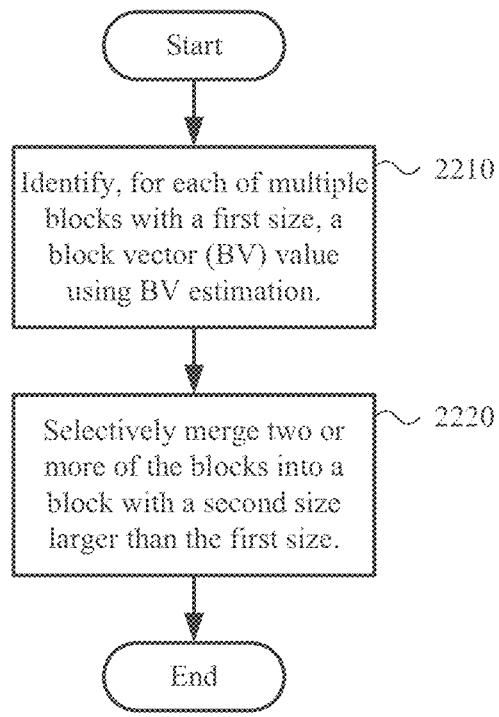
FIG. 22 is a flowchart illustrating a generalized technique for selectively merging blocks into a larger block during BV estimation.

FIG. 22 shows a technique (2200) for selectively merging blocks into a larger block during BV estimation. The technique (2200) can be performed by an encoder such as one described with reference to FIG. 3 or FIGS. 5a and 5b, or by another encoder.

According to the technique, when the encoder encodes data for a picture using intra BC prediction, fir each of multiple blocks with a first size, the encoder identifies (2210) a BV value using BV estimation. The first size can be 8×8, 16×16, 32×32 or some other size. In general, for each of the blocks with the first size, the BV estimation includes determining a cost for a candidate BV value. The cost can include a rate cost and/or a distortion cost. The identified BV value references an intra-prediction region that does not overlap the block with the first size.

The encoder selectively merges (2220) two or more of the blocks into a block with a second size larger than the first size. The second size can be 16×16, 3202, 64×64 or some other size. For example, the encoder compares the BV values of two or more adjacent blocks among the multiple blocks with the first size and, if the compared BV values are identical, merges the two or more adjacent blocks into the block with the second size. The block with the second size is assigned the identical BV value. Unlike the blocks with the first size, the BV value can reference an intra-prediction region that overlaps the block with the second size.

The encoder can repeat the technique (2200) for another block. Eventually, the encoder outputs the encoded data for the picture.

In some example implementations, each of the multiple blocks with the first size is a CB, and the block with the second size is also a CB. Intra BC prediction, however, is performed on a TB-by-TB basis. The BV estimation can use a full search of a search range for each of the multiple blocks with the first size. Or, the BV estimation can use a partial search of a search range for each of the multiple blocks with the tint size, for example, starting at a predicted BV value for the block, and potentially terminating the partial search based at least in part on the cost for a candidate BV value that has been evaluated.

Figure 23:
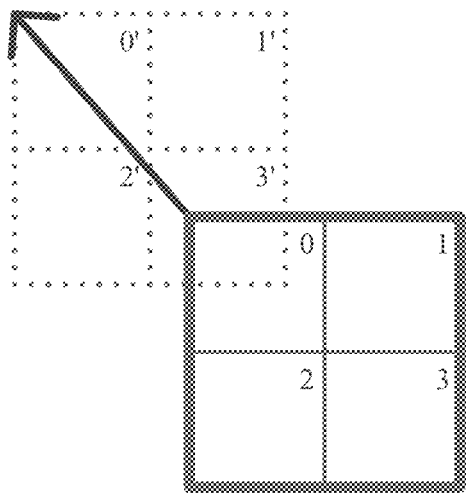
FIG. 23 is a diagram illustrating an advantage of selectively merging blocks into a larger block during BV estimation.

FIG. 23 illustrates an advantage of selective merging (2300) of blocks into a larger block during BV estimation. In FIG. 23, four blocks numbered 0, 1, 2 and 3 (indicated with light solid lines) have BV values that reference corresponding intra-prediction regions 0', 1', 2' and 3', respectively. That is, the BV value references intra-prediction region 0' for block 0, references intra-prediction region 1' for block 1, and so on. The intra-prediction regions are indicated with dotted lines. None of the blocks 0, 1, 2 or 3 overlaps its corresponding intra-prediction region. The larger block that includes blocks 0, 1, 2 and 3 (indicated with a heavy solid line) does overlap its corresponding intra-prediction region, however. If the encoder were to perform BV estimation for the larger block, when overlap between intra-prediction region and block is prohibited, the encoder would not be able to identify the BV value shown in FIG. 23 as an allowable BV value. In contrast, when the encoder performs BV estimation for the smaller blocks 0, 1, 2 and 3, the encoder identifies the same BV value for all four blocks, and the encoder can merge the four blocks into the larger block with the same BV value. During encoding or decoding, the larger block will be split into smaller blocks for the actual intra BC prediction operations. For example, a CB having a given size is split into smaller TBs for performance of the intra BC prediction operations on a TB-by-TB basis, with no overlap between a TB and its intra-prediction region.

B. Concurrent Block Vector Estimation and Block Splitting Decisions.

The encoder can perform BV estimation and block splitting decisions concurrently for a current block. In particular, when intra BC prediction operations are performed on a TB-by-TB basis, the encoder can concurrently evaluate a candidate BV value and possible block splitting decisions for a current block.

Figure 24:
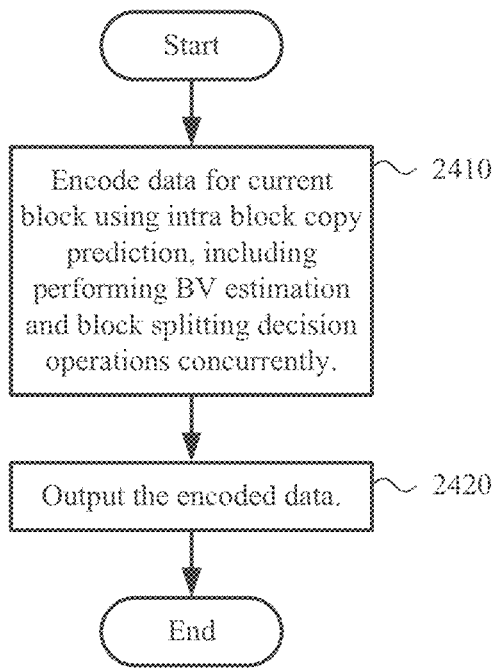
FIG. 24 is a flowchart illustrating a generalized technique for concurrently performing BV estimation and making block splitting decisions for a block.

FIG. 24 is a flowchart illustrating a generalized technique for concurrently performing BV estimation and making block splitting decisions for a block. The technique (2400) can be performed by an encoder such as one described with reference to FIG. 3 or FIGS. 5a and 5b, or by another encoder.

When the encoder encodes data for a picture using intra BC prediction, the encoder encodes (2410) data for a current block. As part of the encoding (2410), the encoder performs BV estimation operations and block splitting decision operations concurrently. In some example implementations, the current block is a CB corresponding in size to a TB, and intra BC prediction is performed on a TB-by-TB basis. For example, as part of the encoding (2410), the encoder performs the technique (2500) shown in FIG. 25 to concurrently evaluate a candidate BV value and possible block splitting decisions for the current block.

Figure 25:
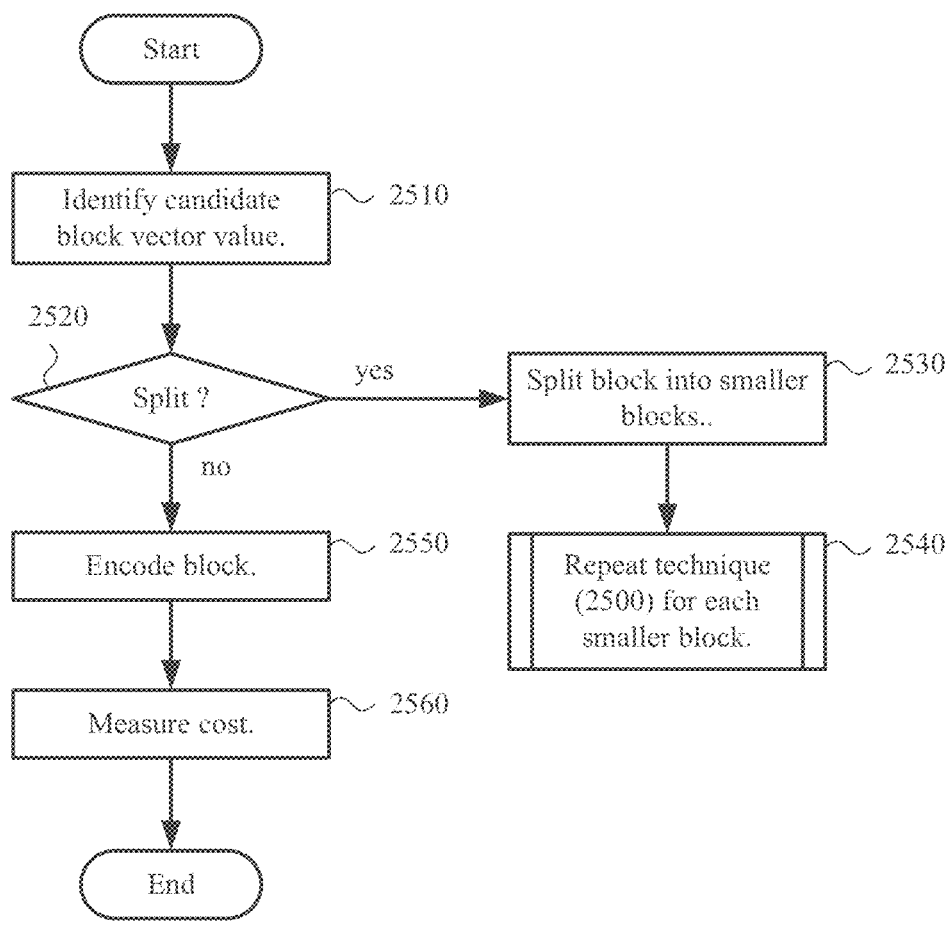
FIG. 25 is flowchart illustrating an example technique tier concurrently evaluating a candidate BV value and block splitting decisions for a block.

FIG. 25 is flowchart illustrating an example technique for concurrently evaluating a candidate BV value and block splitting decisions for a block. The technique (2500) can be performed by an encoder such as one described with reference to FIG. 3 or FIGS. 5a and 5b, or by another encoder.

The encoder identifies (2510) a candidate BV value for the current block using BV estimation operations. The current block has a first size. For example, the first size is 8×8, 16×16, 32×32, 64×64 or some other size.

The encoder checks (2520) whether to split the current block. For example, the encoder evaluates whether intra BC prediction with the candidate BV value for the current block results in overlap between the current block and an intra-prediction region referenced by the candidate BV value.

Depending on the results of the check (2520), the encoder selectively splits (2530) the current block into multiple blocks each having a second size smaller than the first size. For example, the second size is 4×4, 8×8, 16×16, 32×32, or some other size. Then (the current block having been split), the encoder repeats (2540) the technique (2500) for each of the smaller blocks. That is, for each of the blocks having the second size, the encoder repeats the identifying, the evaluating, the selectively splitting, etc., with the block having the second size being treated as the current block.

On the other hand, if the current block is not split, the encoder encodes (2550) the current block and measures (2560) the cost of encoding the current block. For example, when it encodes the current block, the encoder (a) predicts sample values of the current block using intra BC prediction, (b) determines residual values for the current block using the predicted sample values and the sample values of the current block, (c) optionally applies a frequency transform to the residual values to produce transform coefficients and quantizes the transform coefficients, (d) optionally inverse quantizes the transform coefficients and applies an inverse frequency transform to reconstruct the residual values, and (e) combines the residual values and the predicted sample values. The measured cost can be a rate-distortion cost, rate cost or distortion cost. The rate cost can account for both cost of signaling the BV value and cost of signaling block splitting decision information.

Alternatively, the encoder evaluates a candidate BV value and possible block splitting decisions for the current block in some other way. For example, in addition to considering overlap between an intra-prediction region and block, the encoder also considers whether the block already has the smallest allowable size. If so, the block is not split, but the candidate BV value is disallowed.

Returning to FIG. 24, as part of the encoding (2410), the encoder can record the cost for the candidate BV value. The encoder can then evaluate one or more other candidate BV values. For example, the encoder repeats the technique (2500) for another candidate BV value. Eventually, the encoder selects one or more BVs and makes block splitting decisions for the current block (and blocks within the current block) that result in lowest cost (e.g., rate-distortion cost, rate cost or distortion cost).

The encoder outputs (2420) the encoded data for the block. The encoder can repeat the technique (2400) for another block.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

The invention claimed is:

1. In a computing system that implements a video encoder, a method comprising:
    receiving a picture of a video sequence;
    encoding the picture to produce encoded data, including reconstructing first and second blocks of the picture, each of the first and second blocks having a prediction mode, and performing in-loop deblock filtering across a boundary between the first and second blocks, wherein the performing the in-loop deblock filtering includes:
        checking if the prediction mode for at least one of the first and second blocks is intra spatial prediction mode;
        determining that the prediction mode for neither of the first and second blocks is the intra spatial prediction mode;
        selectively assigning a filtering strength value that indicates moderate filtering or a filtering strength value that indicates no filtering depending at least in part on the prediction modes of the first and second blocks, respectively, wherein the prediction mode for each of the first and second blocks is intra block copy ("BC") prediction mode or inter prediction mode, and wherein the selectively assigning includes:
            checking presence/absence of non-zero transform coefficients for the first and second blocks, the filtering strength value that indicates moderate filtering being assigned if either of the first and second blocks includes any non-zero transform coefficients;
            determining that neither of the first and second blocks has non-zero transform coefficients;
            determining that the prediction mode for both of the first and second blocks is the intra BC prediction mode;
            checking a value of a block vector for each of the first and second blocks; and
            determining whether a difference between vector components of the values of the block vectors for the first and second blocks is greater than a threshold amount, wherein the filtering strength value that indicates moderate filtering is assigned if the difference between the vector components of the values of the block vectors for the first and second blocks is greater than the threshold amount; and
    outputting, as part of a bitstream, the encoded data.

2. The method of claim 1, wherein the first and second blocks are transform blocks associated with one or more coding units, and wherein the block vectors for the first and second blocks are signaled for prediction units associated with the one or more coding units.

3. The method of claim 1, wherein the encoding the picture further includes reconstructing third and fourth blocks of the picture and performing in-loop deblock filtering across a boundary between the third and fourth blocks, and wherein the performing in-loop deblock filtering across the boundary between the third and fourth blocks includes:
    checking if prediction mode for at least one of the third and fourth blocks is the intra spatial prediction mode;
    determining that the prediction mode for at least one of the third and fourth blocks is the intra spatial prediction mode; and
    assigning a filtering strength value that indicates strong filtering.

4. The method of claim 1, wherein the encoding the picture further includes reconstructing third and fourth blocks of the picture and performing in-loop deblock filtering across a boundary between the third and fourth blocks, and wherein the performing in-loop deblock filtering across the boundary between the third and fourth blocks includes:
    checking if prediction mode for at least one of the third and fourth blocks is the intra spatial prediction mode;
    determining that the prediction mode for neither of the third and fourth blocks is the intra spatial prediction mode; and
    selectively assigning the filtering strength value that indicates moderate filtering or the filtering strength value that indicates no filtering depending at least in part on the prediction modes of the third and fourth blocks, respectively, wherein the prediction mode for each of the third and fourth blocks is the intra BC prediction mode or the inter prediction mode, including:
        checking presence/absence of non-zero transform coefficients for the third and fourth blocks, the filtering strength value that indicates moderate filtering being assigned if either of the third and fourth blocks includes any non-zero transform coefficients;
        determining that neither of the third and fourth blocks has non-zero transform coefficients;

determining that the prediction mode for one of the third and fourth blocks is the intra BC prediction mode and the prediction mode for the other of the third and fourth blocks is the inter prediction mode; and assigning the filtering strength value that indicates moderate filtering.

5. The method of claim 1, wherein the encoding the picture further includes reconstructing third and fourth blocks of the picture and performing in-loop deblock filtering across a boundary between the third and fourth blocks, wherein the third and fourth blocks are transform blocks associated with one or more coding units, and wherein the performing in-loop deblock filtering across the boundary between the third and fourth blocks includes:

checking if prediction mode for at least one of the third and fourth blocks is the intra spatial prediction mode;

determining that the prediction mode for neither of the third and fourth blocks is the intra spatial prediction mode;

selectively assigning the filtering strength value that indicates moderate filtering or the filtering strength value that indicates no filtering depending at least in part on the prediction modes of the third and fourth blocks, respectively, wherein the prediction mode for each of the third and fourth blocks is the intra BC prediction mode or the inter prediction mode, including:

checking presence/absence of non-zero transform coefficients for the third and fourth blocks, the filtering strength value that indicates moderate filtering being assigned if either of the third and fourth blocks includes any non-zero transform coefficients;

determining that neither of the third and fourth blocks has non-zero transform coefficients; and determining that the prediction mode for both of the third and fourth blocks is the inter prediction mode.

6. The method of claim 5, wherein the performing in-loop deblock filtering across the boundary between the third and fourth blocks further includes:

checking reference index values for the third and fourth blocks; and determining whether the reference index values for the third and fourth blocks are different, wherein the filtering strength value that indicates moderate filtering is assigned if the reference index values for the third and fourth blocks are different.

7. The method of claim 5, wherein the performing in-loop deblock filtering across the boundary between the third and fourth blocks further includes:

checking a value of a motion vector for each of the third and fourth blocks, wherein the motion vectors for the third and fourth blocks are signaled for prediction units associated with the one or more coding units; and determining whether a difference between vector components of the values of the motion vectors for the third and fourth blocks is greater than a second threshold amount, wherein the filtering strength value that indicates moderate filtering is assigned if the difference between the vector components of the values of the motion vectors for the third and fourth blocks is greater than the second threshold amount.

8. A computing system comprising memory and one or more processing units, wherein the computing system implements a video decoder configured to perform operations comprising:

receiving encoded data in a bitstream for at least part of a video sequence; and decoding the encoded data, including reconstructing first and second blocks of a picture of the video sequence, each of the first and second blocks having a prediction mode, and performing in-loop deblock filtering across a boundary between the first and second blocks, wherein the performing the in-loop deblock filtering includes:

checking if the prediction mode for at least one of the first and second blocks is intra spatial prediction mode;

determining that the prediction mode for neither of the first and second blocks is the intra spatial prediction mode;

selectively assigning a filtering strength value that indicates moderate filtering or a filtering strength value that indicates no filtering depending at least in part on the prediction modes of the first and second blocks, respectively, wherein the prediction mode for each of the first and second blocks is intra block copy ("BC") prediction mode or inter prediction mode, wherein the selectively assigning includes:

checking presence/absence of non-zero transform coefficients for the first and second blocks, the filtering strength value that indicates moderate filtering being assigned if either of the first and second blocks includes any non-zero transform coefficients;

determining that neither of the first and second blocks has non-zero transform coefficients;

determining that the prediction mode for both of the first and second blocks is the intra BC prediction mode;

checking a value of a block vector for each of the first and second blocks; and determining whether a difference between vector components of the values of the block vectors for the first and second blocks is greater than a threshold amount, wherein the filtering strength value that indicates moderate filtering is assigned if the difference between the vector components of the values of the block vectors for the first and second blocks is greater than the threshold amount.

9. The computing system of claim 8, wherein the first and second blocks are transform blocks associated with one or more coding units, and wherein the block vectors for the first and second blocks are signaled for prediction units associated with the one or more coding units.

10. The computing system of claim 8, wherein the decoding the encoded data further includes reconstructing third and fourth blocks of the picture and performing in-loop deblock filtering across a boundary between the third and fourth blocks, and wherein the performing in-loop deblock filtering across the boundary between the third and fourth blocks includes:

checking if prediction mode for at least one of the third and fourth blocks is the intra spatial prediction mode;

determining that the prediction mode for at least one of the third and fourth blocks is the intra spatial prediction mode; and assigning a filtering strength value that indicates strong filtering.

11. The computing system of claim 8, wherein the decoding the encoded data further includes reconstructing third and fourth blocks of the picture and performing in-loop deblock filtering across a boundary between the third and fourth blocks, and wherein the performing in-loop deblock filtering across the boundary between the third and fourth blocks includes:
- checking if prediction mode for at least one of the third and fourth blocks is the intra spatial prediction mode;
- determining that the prediction mode for neither of the third and fourth blocks is the intra spatial prediction mode; and
- selectively assigning the filtering strength value that indicates moderate filtering or the filtering strength value that indicates no filtering depending at least in part on the prediction modes of the third and fourth blocks, respectively, wherein the prediction mode for each of the third and fourth blocks is the intra BC prediction mode or the inter prediction mode, including:
  - checking presence/absence of non-zero transform coefficients for the third and fourth blocks, the filtering strength value that indicates moderate filtering being assigned if either of the third and fourth blocks includes any non-zero transform coefficients;
  - determining that neither of the third and fourth blocks has non-zero transform coefficients;
  - determining that the prediction mode for one of the third and fourth blocks is the intra BC prediction mode and the prediction mode for the other of the third and fourth blocks is the inter prediction mode; and
  - assigning the filtering strength value that indicates moderate filtering.

12. The computing system of claim 8, wherein the decoding the encoded data further includes reconstructing third and fourth blocks of the picture and performing in-loop deblock filtering across a boundary between the third and fourth blocks, wherein the third and fourth blocks are transform blocks associated with one or more coding units, and wherein the performing in-loop deblock filtering across the boundary between the third and fourth blocks includes:
- checking if prediction mode for at least one of the third and fourth blocks is the intra spatial prediction mode;
- determining that the prediction mode for neither of the third and fourth blocks is the intra spatial prediction mode; and
- assigning the filtering strength value that indicates moderate filtering or the filtering strength value that indicates no filtering depending at least in part on the prediction modes of the third and fourth blocks, respectively, wherein the prediction mode for each of the third and fourth blocks is the intra BC prediction mode or the inter prediction mode, including:
  - checking presence/absence of non-zero transform coefficients for the third and fourth blocks, the filtering strength value that indicates moderate filtering being assigned if either of the third and fourth blocks includes any non-zero transform coefficients;
  - determining that neither of the third and fourth blocks has non-zero transform coefficients; and
  - determining that the prediction mode for both of the third and fourth blocks is the inter prediction mode.

13. The computing system of claim 12, wherein the performing in-loop deblock filtering across the boundary between the third and fourth blocks further includes:
- checking reference index values for the third and fourth blocks; and
- determining whether the reference index values for the third and fourth blocks are different, wherein the filtering strength value that indicates moderate filtering is assigned if the reference index values for the third and fourth blocks are different.

14. The computing system of claim 12, wherein the performing in-loop deblock filtering across the boundary between the third and fourth blocks further includes:
- checking a value of a motion vector for each of the third and fourth blocks, wherein the motion vectors for the third and fourth blocks are signaled for prediction units associated with the one or more coding units; and
- determining whether a difference between vector components of the values of the motion vectors for the third and fourth blocks is greater than a second threshold amount, wherein the filtering strength value that indicates moderate filtering is assigned if the difference between the vector components of the values of the motion vectors for the third and fourth blocks is greater than the second threshold amount.

15. One or more computer-readable media having stored thereon encoded data in a bitstream for at least part of a video sequence, the encoded data being organized to facilitate decoding by operations comprising:
- reconstructing first and second blocks of a picture of the video sequence, each of the first and second blocks having a prediction mode; and
- performing in-loop deblock filtering across a boundary between the first and second blocks, wherein the performing the in-loop deblock filtering includes:
  - checking if the prediction mode for at least one of the first and second blocks is intra spatial prediction mode;
  - determining that the prediction mode for neither of the first and second blocks is the intra spatial prediction mode;
  - selectively assigning a filtering strength value that indicates moderate filtering or a filtering strength value that indicates no filtering depending at least in part on the prediction modes of the first and second blocks, respectively, wherein the prediction mode for each of the first and second blocks is intra block copy ("BC") prediction mode or inter prediction mode, wherein the selectively assigning includes:
    - checking presence/absence of non-zero transform coefficients for the first and second blocks, the filtering strength value that indicates moderate filtering being assigned if either of the first and second blocks includes any non-zero transform coefficients;
    - determining that neither of the first and second blocks has non-zero transform coefficients;
    - determining that the prediction mode for both of the first and second blocks is the intra BC prediction mode;
    - checking a value of a block vector for each of the first and second blocks; and
    - determining whether a difference between vector components of the values of the block vectors for the first and second blocks is greater than a threshold amount, wherein the filtering strength value that indicates moderate filtering is assigned if the difference between the vector components of the values of the block vectors for the first and second blocks is greater than the threshold amount.

16. The one or more computer-readable media of claim 15, wherein the first and second blocks are transform blocks associated with one or more coding units, and wherein the block vectors for the first and second blocks are signaled for prediction units associated with the one or more coding units.

17. The one or more computer-readable media of claim 15, wherein the operations further include reconstructing third and fourth blocks of the picture and performing in-loop deblock filtering across a boundary between the third and fourth blocks, and wherein the performing in-loop deblock filtering across the boundary between the third and fourth blocks includes:
   checking if prediction mode for at least one of the third and fourth blocks is the intra spatial prediction mode;
   determining that the prediction mode for neither of the third and fourth blocks is the intra spatial prediction mode; and
   selectively assigning the filtering strength value that indicates moderate filtering or the filtering strength value that indicates no filtering depending at least in part on the prediction modes of the third and fourth blocks, respectively, wherein the prediction mode for each of the third and fourth blocks is the intra BC prediction mode or the inter prediction mode, including:
      checking presence/absence of non-zero transform coefficients for the third and fourth blocks, the filtering strength value that indicates moderate filtering being assigned if either of the third and fourth blocks includes any non-zero transform coefficients;
      determining that neither of the third and fourth blocks has non-zero transform coefficients;
      determining that the prediction mode for one of the third and fourth blocks is the intra BC prediction mode and the prediction mode for the other of the third and fourth blocks is the inter prediction mode; and
      assigning the filtering strength value that indicates moderate filtering.

18. The one or more computer-readable media of claim 15, wherein the operations further include reconstructing third and fourth blocks of the picture and performing in-loop deblock filtering across a boundary between the third and fourth blocks, wherein the third and fourth blocks are transform blocks associated with one or more coding units, and wherein the performing in-loop deblock filtering across the boundary between the third and fourth blocks includes:
   checking if prediction mode for at least one of the third and fourth blocks is the intra spatial prediction mode;
   determining that the prediction mode for neither of the third and fourth blocks is the intra spatial prediction mode; and
   selectively assigning the filtering strength value that indicates moderate filtering or the filtering strength value that indicates no filtering depending at least in part on the prediction modes of the third and fourth blocks, respectively, wherein the prediction mode for each of the third and fourth blocks is the intra BC prediction mode or the inter prediction mode, including:
      checking presence/absence of non-zero transform coefficients for the third and fourth blocks, the filtering strength value that indicates moderate filtering being assigned if either of the third and fourth blocks includes any non-zero transform coefficients;
      determining that neither of the third and fourth blocks has non-zero transform coefficients; and
      determining that the prediction mode for both of the third and fourth blocks is the inter prediction mode.

19. The one or more computer-readable media of claim 18, wherein the performing in-loop deblock filtering across the boundary between the third and fourth blocks further includes:
   checking reference index values for the third and fourth blocks; and
   determining whether the reference index values for the third and fourth blocks are different, wherein the filtering strength value that indicates moderate filtering is assigned if the reference index values for the third and fourth blocks are different.

20. The one or more computer-readable media of claim 18, wherein the performing in-loop deblock filtering across the boundary between the third and fourth blocks further includes:
   checking a value of a motion vector for each of the third and fourth blocks, wherein the motion vectors for the third and fourth blocks are signaled for prediction units associated with the one or more coding units; and
   determining whether a difference between vector components of the values of the motion vectors for the third and fourth blocks is greater than a second threshold amount, wherein the filtering strength value that indicates moderate filtering is assigned if the difference between the vector components of the values of the motion vectors for the third and fourth blocks is greater than the second threshold amount.

\* \* \* \* \*